US008891261B2

(12) United States Patent
Jang et al.

(10) Patent No.: US 8,891,261 B2
(45) Date of Patent: *Nov. 18, 2014

(54) THREE-PHASE THREE-LEVEL SOFT-SWITCHED PFC RECTIFIERS

(71) Applicant: Delta Electronics, Inc., Neihu (TW)

(72) Inventors: Yungtaek Jang, Chapel Hill, NC (US); Milan M. Jovanović, Cary, NC (US)

(73) Assignee: Delta Electronics, Inc., Neihu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/861,241

(22) Filed: Apr. 11, 2013

(65) Prior Publication Data
US 2013/0235626 A1 Sep. 12, 2013

Related U.S. Application Data

(63) Continuation-in-part of application No. 13/362,620, filed on Jan. 31, 2012, now Pat. No. 8,687,388.

(51) Int. Cl.
| H02M 1/12 | (2006.01) |
|---|---|
| H02M 5/458 | (2006.01) |
| H02M 7/217 | (2006.01) |
| H02M 1/42 | (2007.01) |
| H02M 7/23 | (2006.01) |

(52) U.S. Cl.
CPC ............ *H02M 5/4585* (2013.01); *H02M 7/217* (2013.01); *H02M 1/4216* (2013.01); *H02M 7/23* (2013.01); *Y02B 70/126* (2013.01)
USPC .......................................................... 363/44

(58) Field of Classification Search
USPC ............ 363/39, 40, 44, 84, 89, 125; 307/105, 307/110
See application file for complete search history.

(56) References Cited

U.S. PATENT DOCUMENTS

| 5,499,178 | A |   | 3/1996 | Mohan |        |
|---|---|---|---|---|---|
| 5,654,882 | A | * | 8/1997 | Kanazawa et al. | 363/37 |

(Continued)

OTHER PUBLICATIONS

Barbosa, Peter et al.: "Analysis and Evaluation of the Two-Switch Three-Level Boost Rectifier", IEEE Power Electronics Specialist Conf. (PESC) Record, 2001, pp. 1659-1664.

(Continued)

*Primary Examiner* — Adolf Berhane
(74) *Attorney, Agent, or Firm* — Edward C. Kwok; Hogan Lovells US LLP

(57) ABSTRACT

A low input-current-harmonic three-phase three-level boost rectifier includes an input stage for receiving a three-phase input voltage in relation to a neutral node and an output stage adapted to couple to at least one load. The rectifier further includes one or more switching converter stages, each having a plurality of serially-connected switches coupled to the neutral node, one of the serially-connected switches operating with a fixed duty cycle while the other of the serially-connected switches operating with a variable duty cycle, the fixed duty cycle being a substantially 50% duty cycle and the variable duty cycle being less than or equal to a substantially 50% duty cycle. The serially-connected switches are coupled to clamping diodes and clamping capacitors. The rectifier further includes one or more controllers adapted to vary the switching frequency and/or duty cycle of the plurality of switches based on at least one of a condition of the at least one load or the input voltage and includes one or more decoupling stages, each including one or more inductive elements adapted to inductively decouple the output stage from at least one of the one or more switching converter stages.

49 Claims, 35 Drawing Sheets

(56) References Cited

U.S. PATENT DOCUMENTS

| | | | |
|---|---|---|---|
| 5,719,757 A * | 2/1998 | Beyerlein et al. | 363/34 |
| 5,933,336 A * | 8/1999 | Jiang et al. | 363/44 |
| 5,982,646 A * | 11/1999 | Lyons et al. | 363/58 |
| 6,026,006 A | 2/2000 | Jiang et al. | |
| 6,038,151 A * | 3/2000 | Jiang et al. | 363/89 |
| 6,239,995 B1 | 5/2001 | Weng et al. | |
| 6,567,283 B2 * | 5/2003 | Welches | 363/89 |
| 6,671,195 B2 * | 12/2003 | Perreault et al. | 363/89 |
| 6,900,997 B2 * | 5/2005 | Perreault et al. | 363/127 |
| 7,005,759 B2 | 2/2006 | Ying et al. | |
| 7,920,393 B2 * | 4/2011 | Bendre et al. | 363/39 |
| 7,932,693 B2 * | 4/2011 | Lee et al. | 318/802 |
| 8,687,388 B2 * | 4/2014 | Jang et al. | 363/44 |

OTHER PUBLICATIONS

Contreras, Jose G. et al.: "A Three-Phase High Power Factor PWM ZVS Power Supply with a Single Power Stage", pp. 356-362.

Kolar, J. W. et al.: "A Novel Three-Phase Utility Interface Minimizing Line Current Harmonics of High-Power Telecommunication Rectifiers Modules", Record of the 16th, IEEE International Telecommunications Energy Conference, Vancouver, Canada, Oct. 30-Nov. 3, 1994, pp. 367-374.

Meng, Tao et al.: "Improved Three-Phase Single-Stage Isolated PFC Converter with Voltage-Clamping in Primary Side", Department of Electrical Engineering, Harbin Institute of Technology, pp. 1909-1913.

Nishimura, K. et al.: "A Novel Prototype Discontinuous Inductor Current Mode Operated Three-Phase PFC Power Converter with Four Active Switches", IEEE Power Electronics Specialist Conf. (PESC) Record, 2006, pp. 824-830.

Prasad, A. R. et al.: "An Active Power Factor Correction Technique for Three-Phase Diode Rectifiers", IEEE Transactions on Power Electronics, vol. 6, No. 1 pp. 83-92, Jan. 1991.

Xu, D. M. et al.: "Quasa Soft-Switching Partly Decoupled Three-Phase PFC with Approximate Unity Power Factor", IEEE Applied Power Electronics Conference (APEC) Proc., 1998, pp. 953-957.

* cited by examiner

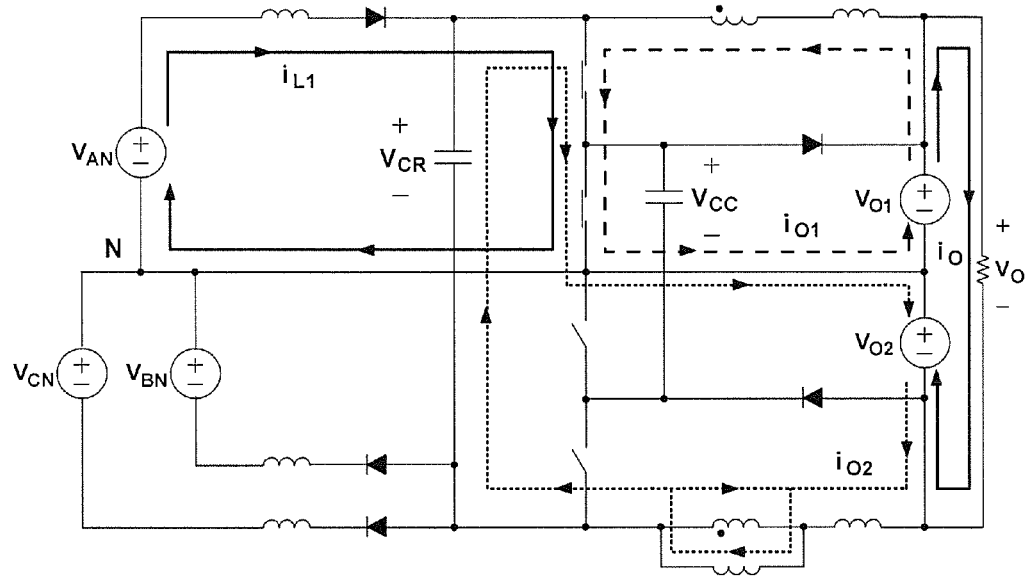
Fig. 5(a) [ $T_0 - T_1$ ]
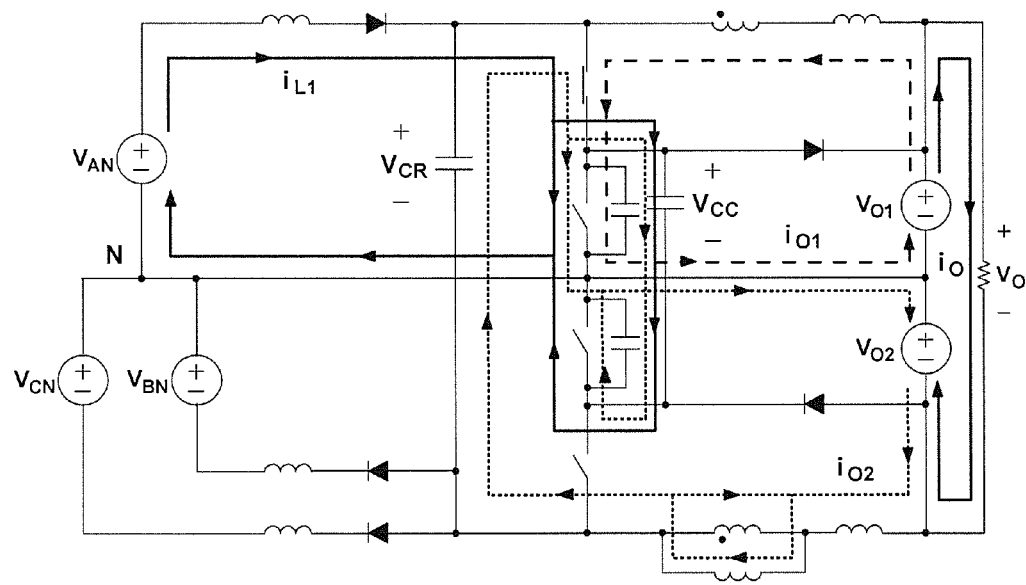
Fig. 5(b) [ $T_1 - T_2$ ]

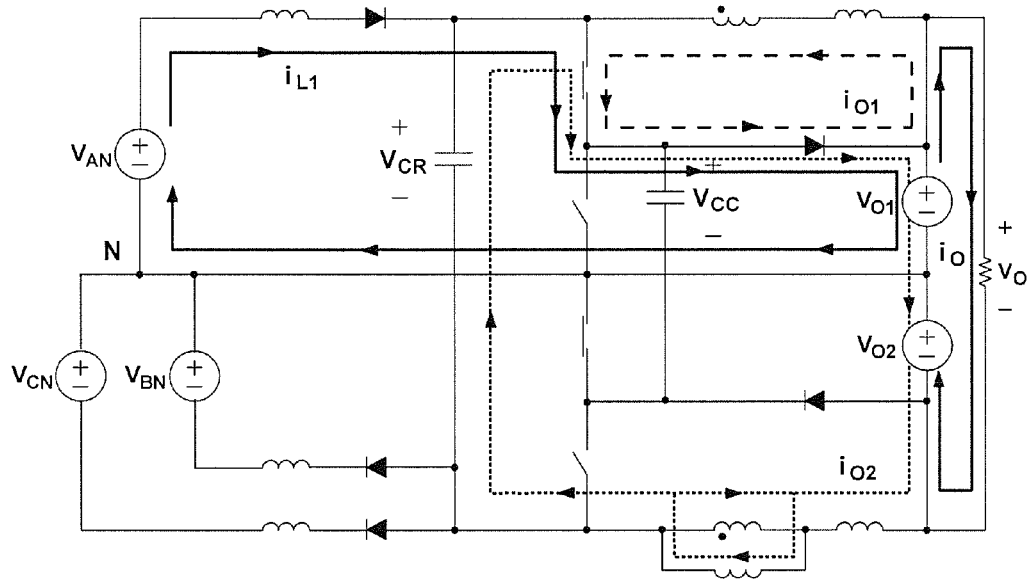
Fig. 5(c) [ $T_2$ - $T_3$ ]
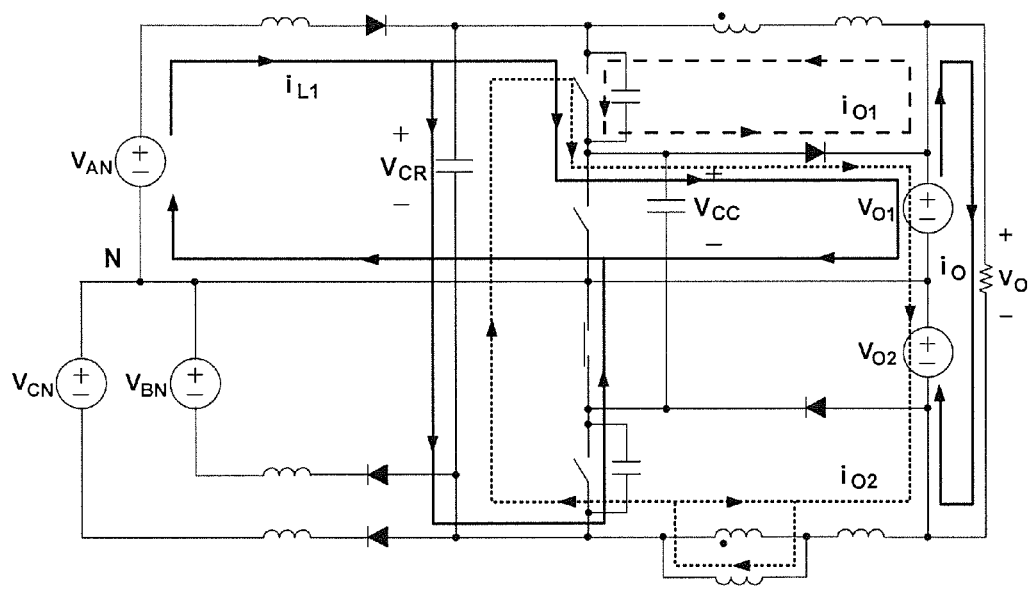
Fig. 5(d) [ $T_3$ - $T_4$ ]

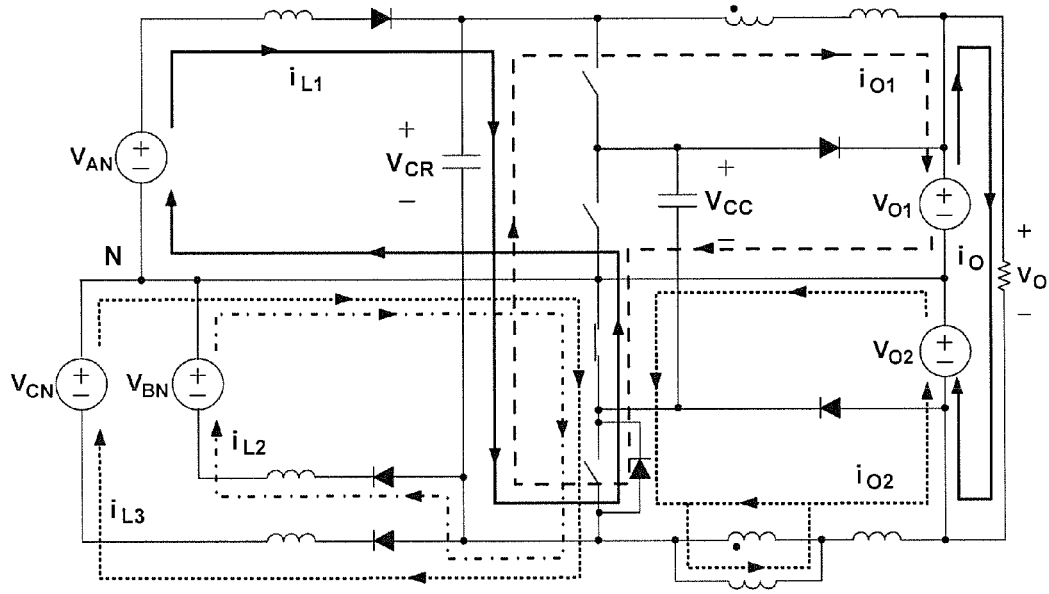
Fig. 5(e) [ T$_4$ - T$_5$ ]
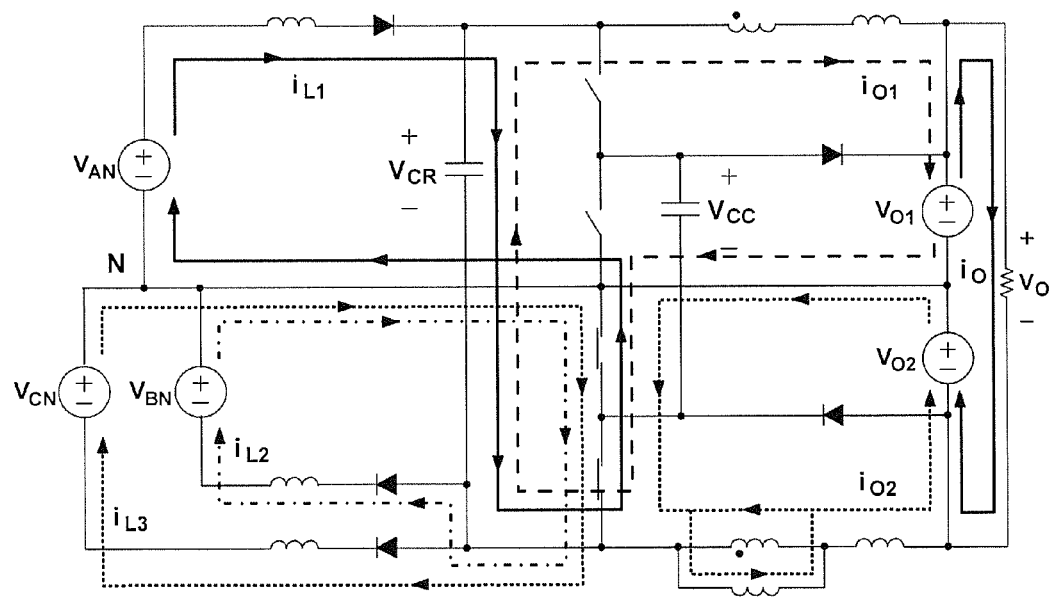
Fig. 5(f) [ T$_5$ - T$_6$ ]

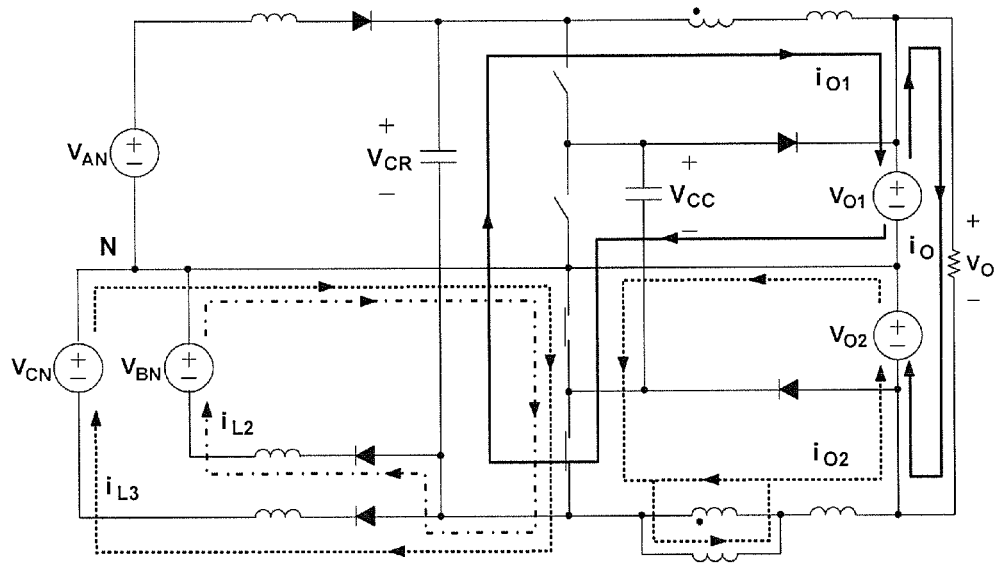
Fig. 5(g) [$T_6 - T_7$]
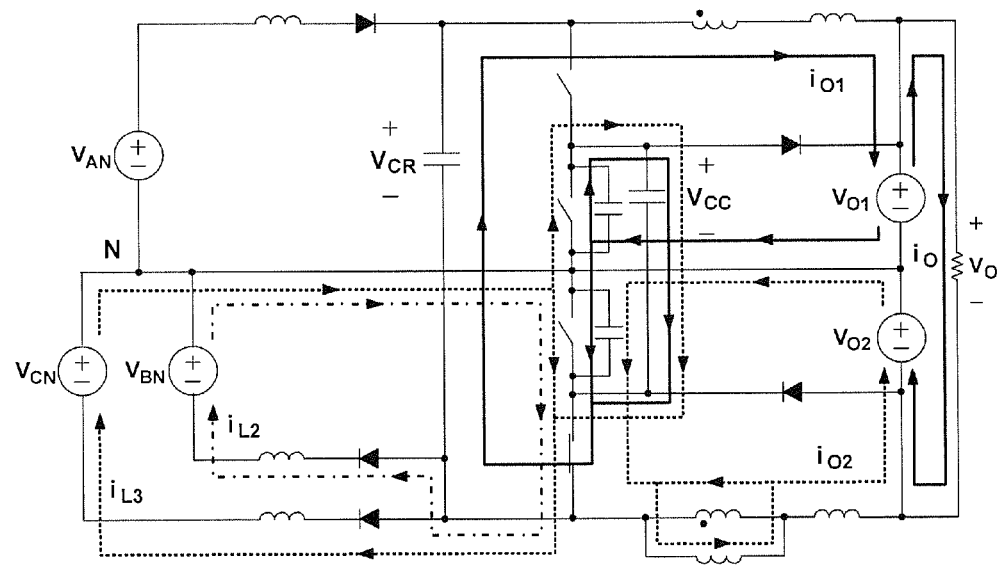
Fig. 5(h) [$T_7 - T_8$]

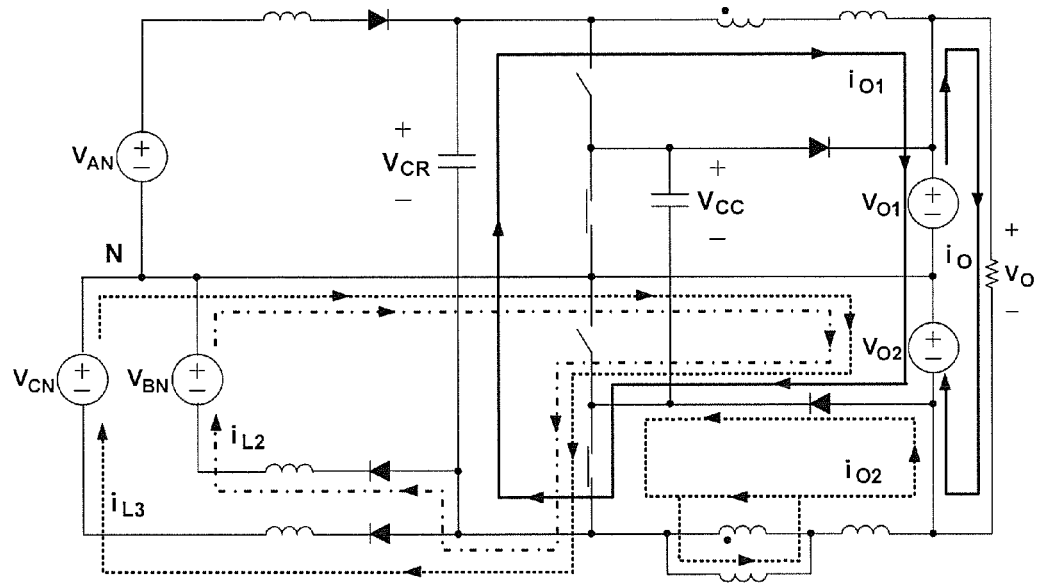
Fig. 5(i) [ $T_8$ - $T_9$ ]
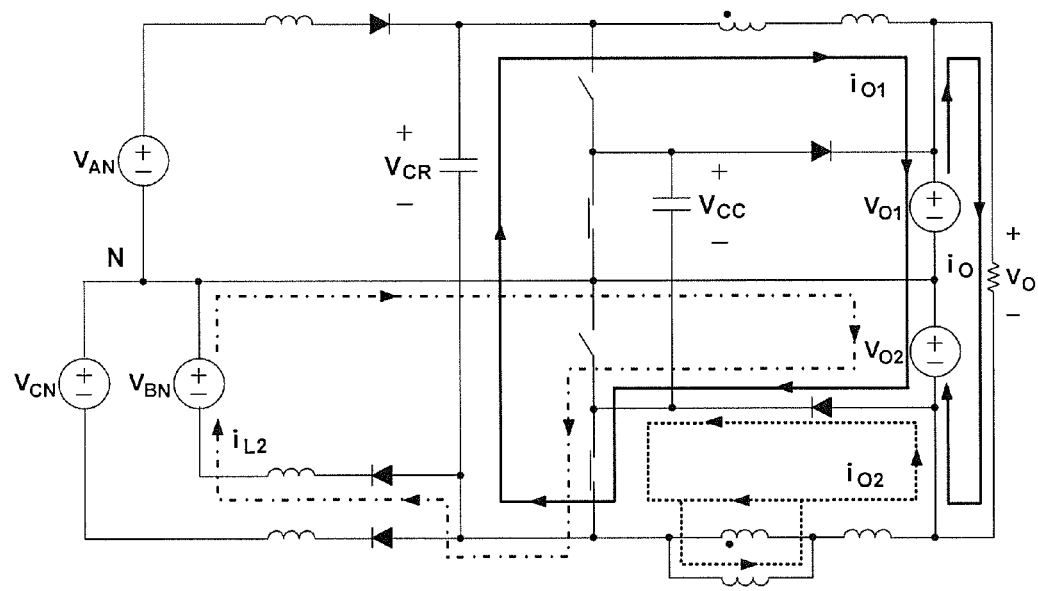
Fig. 5(j) [ $T_9$ - $T_{10}$ ]

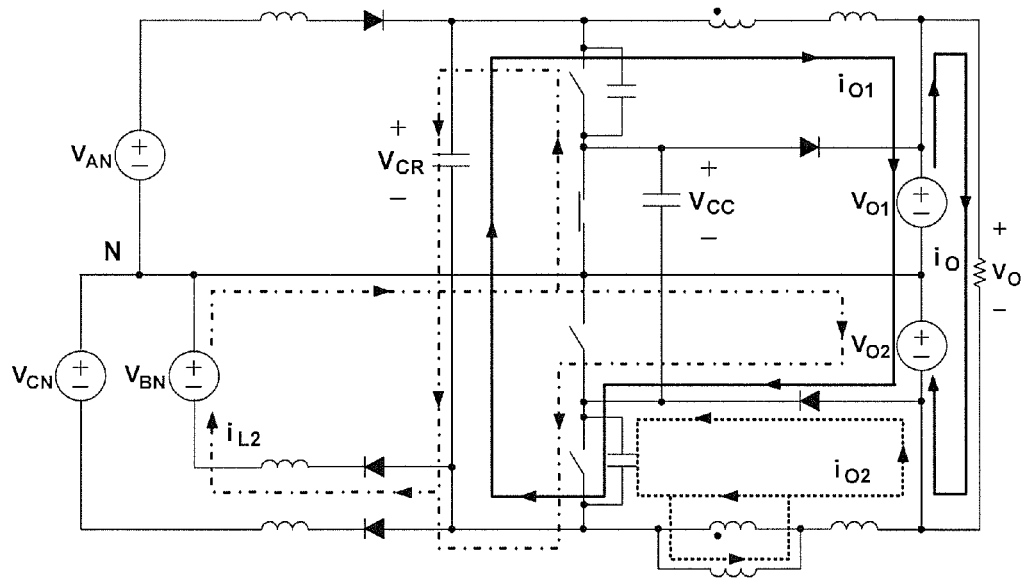
Fig. 5(k) [ $T_{10}$ - $T_{11}$ ]
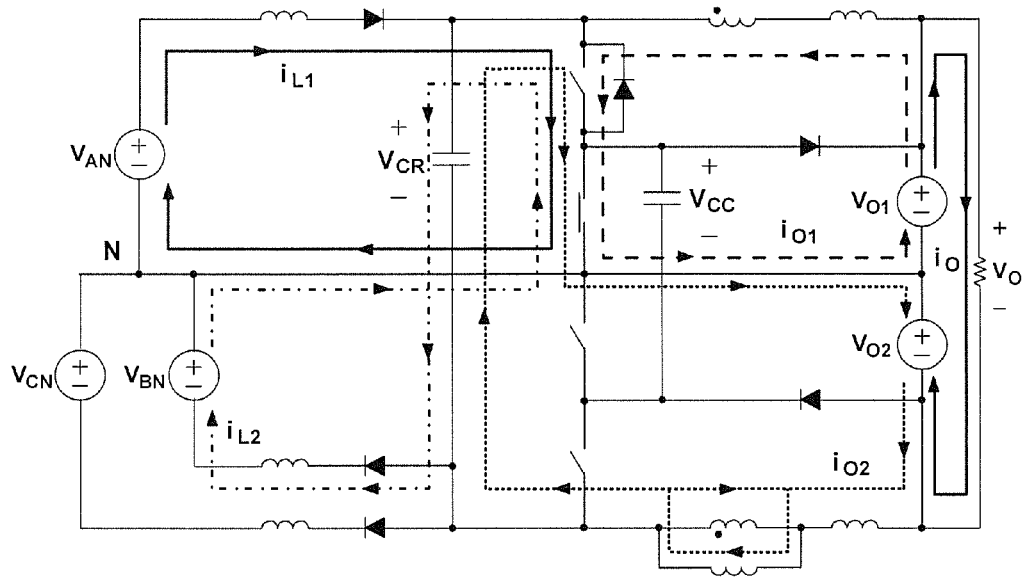
Fig. 5(l) [ $T_{11}$ - $T_{12}$ ]

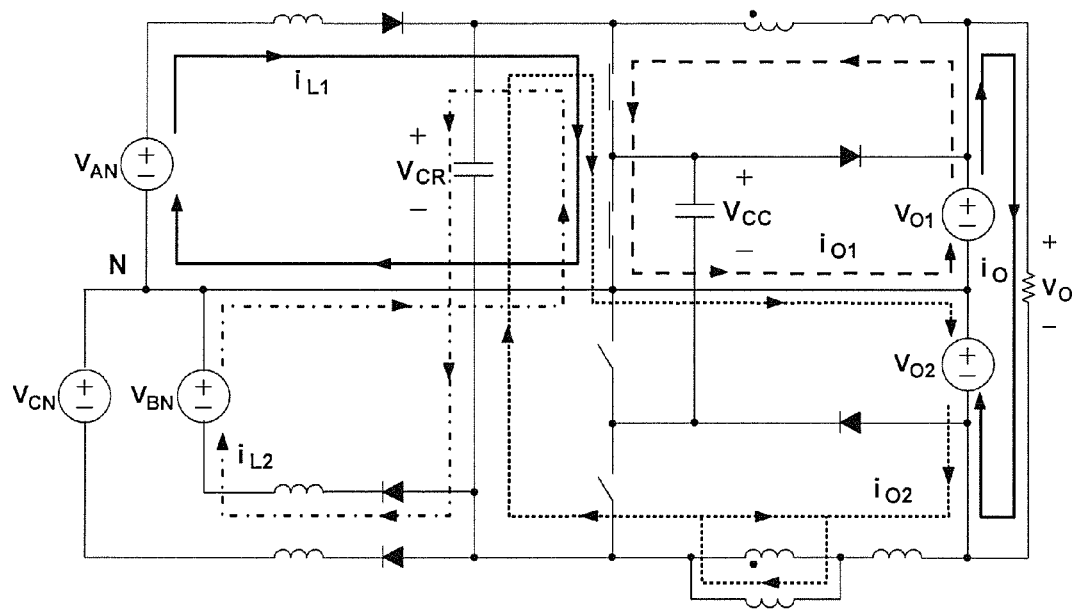
Fig. 5(m) [ $T_{12}$ - $T_{13}$ ]
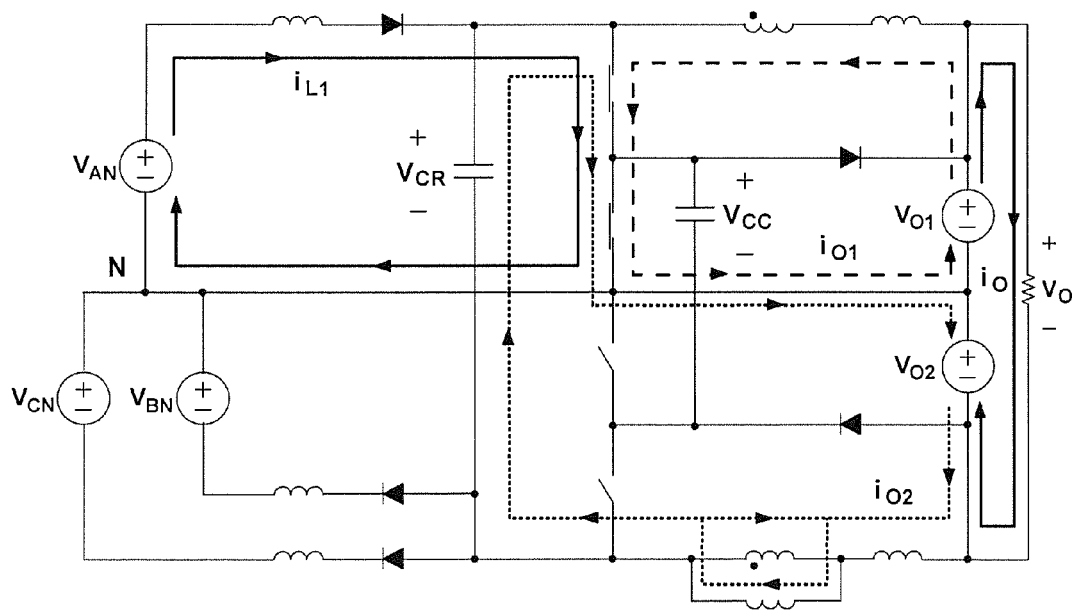
Fig. 5(n) [ $T_{13}$ - $T_{14}$ ]

THREE-PHASE THREE-LEVEL SOFT-SWITCHED PFC RECTIFIERS

CROSS REFERENCE TO RELATED APPLICATIONS

The present application is a continuation-in-part of copending U.S. patent application ("Copending Application"), Ser. No. 13/362,620, entitled "THREE-PHASE SOFT-SWITCHED PFC RECTIFIERS," by Jang and Jovanović, filed on Jan. 31, 2012. The Copending Application is hereby incorporated by reference herein in its entirety.

BACKGROUND OF THE INVENTION

1. Field of the Invention

The present invention generally relates to front-end rectifiers with power-factor correction (PFC). In particular, the present invention relates to three-phase, three-level PFC rectifiers.

2. Discussion of the Related Art

In power converters, achieving a high efficiency in high-voltage applications is a major design challenge that requires an optimized reduction of conduction and switching losses through a careful selection of the converter topology and switching device characteristics. Specifically, a higher voltage-rated semiconductor switch exhibits larger conduction and switching losses, as compared to a counterpart with a lower voltage rating. In this context, a semiconductor switch may be any switching device, such as a MOSFET (Metal Oxide Semiconductor Field Effect Transistor), an IGBT (Insulated-Gate Bipolar Transistors), a BJT (Bipolar Junction Transistors), a SiC (Silicon-Carbide) or a GaN (Gallium-Nitride).

Generally, switching losses can be reduced and even eliminated using resonant or soft-switching techniques. However, there are only limited approaches for reducing conduction losses. In fact, once the topology and the switches with the lowest conduction losses for the required voltage rating are selected, further decrease in conduction loss is possible only by modifying the topology to utilize switches with a lower voltage rating. Multilevel converters—whose switches operate with a voltage stress that is much less than the input and output voltages—are naturally suitable for high-voltage applications.

The Copending Application describes a new, three-phase, two-switch, zero-voltage switching (ZVS), discontinuous conduction mode (DCM), PFC boost rectifier that achieves a low input-current total harmonic distortion (THD). In that PFC boost rectifier, all the switches operate under ZVS conditions, without using additional soft-switching circuitry. One implementation of the PFC rectifier of the Copending Application is shown in FIG. 1. As shown in FIG. 1, the PFC boost rectifier includes Y-connected capacitors $C_1$, $C_2$, and $C_3$, which create virtual neutral node N. Virtual neutral node N has the same electrical potential as the power source's neutral terminal that is not physically available for connection in a three-wire power system. Since virtual neutral node N is connected to the node between switches $S_1$ and $S_2$ and also to the node between output capacitors $C_{O1}$ and $C_{O2}$, the electrical potentials of these nodes are the same as the electrical potential of the neutral terminal in the balanced three-phase power source.

In addition, by connecting virtual neutral node N directly to the node between switches $S_1$ and $S_2$, decoupling of the three input currents is achieved. In such a decoupled circuit, the current in each of boost inductors $L_1$, $L_2$ and $L_3$ depends only on the corresponding phase voltage, which reduces the THD and increases the power factor (PF). Specifically, bridge diodes $D_1$-$D_6$ allow only the currents in phases with positive phase voltages to flow through switch $S_1$, when switch $S_1$ is turned on, and allow only the currents in phases with negative phase voltages to flow through switch $S_2$, when switch $S_2$ is on. Therefore, the boost inductor corresponding to a phase in a positive voltage half-line cycle carries positive current when switch $S_1$ is on, while the boost inductor corresponding to a phase in a negative voltage half-line cycle carries negative current when switch $S_2$ is on. During the time when switch $S_1$ is off, the stored energy in the boost inductor connected to the positive phase voltage is delivered to capacitor $C_R$, whereas the stored energy in the boost inductor connected to the negative phase voltage is delivered to capacitor $C_R$ during the time when switch $S_2$ is off. Because the voltage between either terminal of capacitor $C_R$ and virtual neutral node N abruptly changes with a high rate (i.e., a large dV/dt value) during each switching cycle, coupled inductor $L_C$ is connected between "flying" capacitor $C_R$ and the output voltage $V_O$ to isolate output voltage $V_O$ from these fast high-voltage transitions that usually produce unacceptable common-mode electromagnetic interference (EMI) noise. As shown in FIG. 1, with coupled inductor $L_C$, the node between output capacitors $C_{O1}$ and $C_{O2}$ can be directly connected to virtual neutral node N, which makes the output common-mode noise very low. Moreover, because of coupled inductor $L_C$, parallel operations of multiple rectifiers are also possible.

To facilitate cross-reference between the figures and the detailed description, like elements are assigned like reference names or numerals.

SUMMARY

The present invention extends PFC and ZVS operations of the switches in the rectifier of FIG. 1 to three-level rectifiers that can utilize switches with a lower voltage rating and, consequently, a lower conduction loss.

According to one embodiment of the present invention, three-phase, three-level PFC rectifier topologies utilize switches with a lower voltage rating and offer improved performance over the prior art because of lower conduction losses. In one preferred embodiment, an input stage consists of three boost inductors $L_1$, $L_2$, and $L_3$ coupled to the three-phase input terminals and capacitors $C_1$, $C_2$, and $C_3$ connected in a Y or "star" configuration. Common node N of the capacitors is connected to a node between serially-connected switch pairs $S_1$-$S_2$ and $S_3$-$S_4$ and also to a node between serially connected output split capacitors $C_{O1}$ and $C_{O2}$. A node between serially-connected switches $S_1$-$S_2$ is connected to output capacitor $C_{O1}$ through clamping diode $D_{C1}$. A node between serially-connected switches $S_3$-$S_4$ is connected to output capacitor $C_{O2}$ through clamping diode $D_{C2}$. Capacitor $C_R$, which resets the currents in the boost inductors, is connected across serially connected switches $S_1$-$S_4$ and output $V_O$ by coupled or non-coupled inductor $L_C$.

The rectifiers of the present invention offer a low THD in the input currents and a high PF. The rectifiers provide high efficiency power conversion using soft-switching techniques over a wide load range. This high efficiency is achieved by operating the boost inductors in DCM and by controlling the output voltages in the rectifiers using variable-frequency control. In addition, the PFC rectifiers of the present invention exhibit a reduced common-mode noise and possess automatic balancing of split capacitors $C_{O1}$ and $C_{O2}$, when serially-connected downstream converters are employed.

In one implementation, galvanic isolation between the input signal and the output signal is achieved using transformer TR, instead of coupled inductor $L_C$. At the secondary side of transformer TR, rectifiers $D_{O1}$ and $D_{O2}$ and output filter including inductor $L_O$ and capacitor $C_O$ are coupled between the secondary winding of transformer TR and output voltage $V_O$. By employing additional phase-shift or PWM control, the isolated implementations can tightly control their output voltages. Circuits may also be interleaved to increase their power handling capabilities and reduce their input or output current and voltage ripples.

The present invention is better understood upon consideration of the following detailed description and the accompanying figures.

BRIEF DESCRIPTION OF THE DRAWINGS

FIGS. 5(a)-5(n) show topological stages illustrating voltages and currents in the model of FIG. 4 during a switching cycle, according to an embodiment of the present invention.

DETAILED DESCRIPTION OF THE PREFERRED EMBODIMENTS

Figure 1:
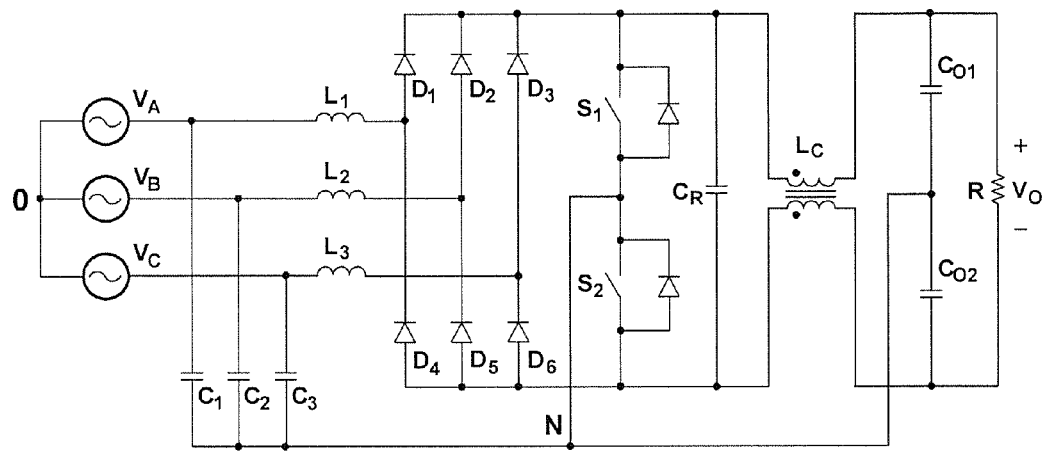
FIG. 1 shows a three-phase, two-switch, ZVS, PFC DCM boost rectifier.
Figure 2:
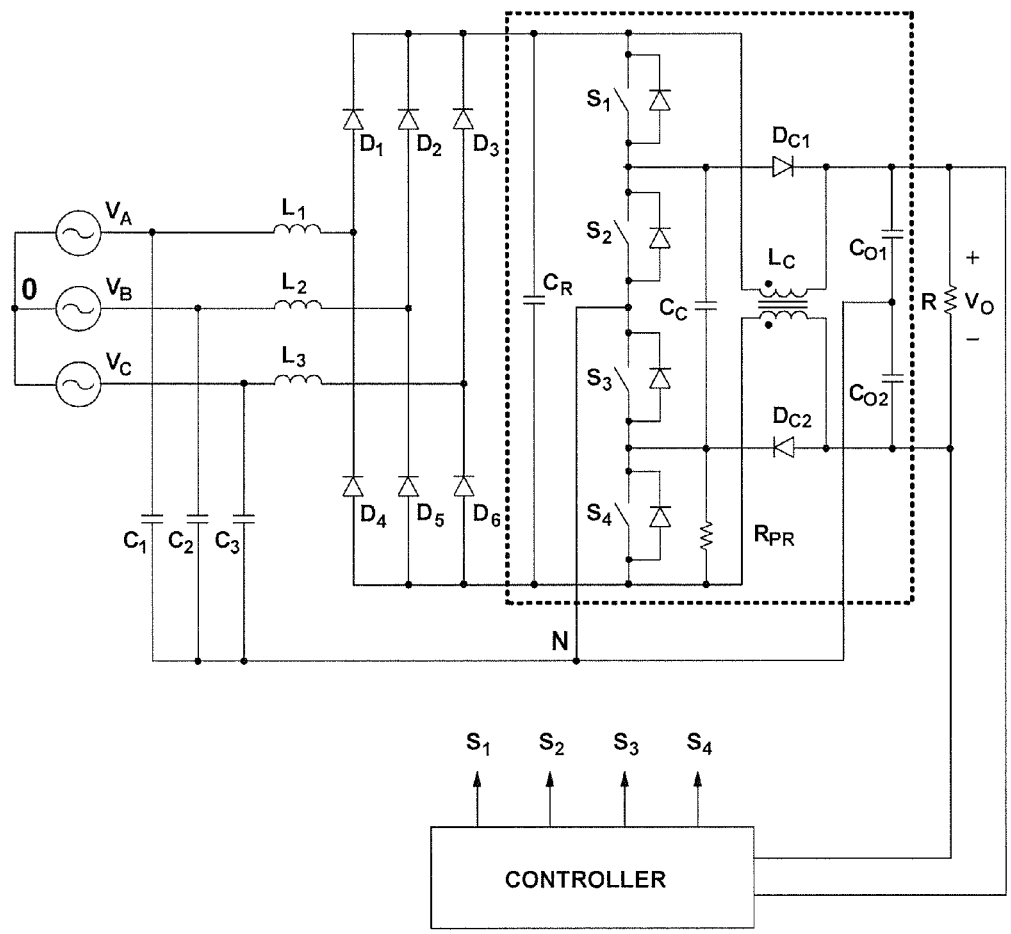
FIG. 2 shows a three-phase three-level ZVS PFC DCM boost rectifier, according to an embodiment of the present invention.

FIG. 2 is a block diagram of a three-phase, three-level ZVS PFC DCM low input-current-harmonic boost rectifier according to an embodiment of the present invention. The input stage of the circuit in FIG. 2 includes boost inductors $L_1$, $L_2$, and $L_3$ coupled to capacitors $C_1$, $C_2$, and $C_3$ connected in a Y ("star") configuration. The input stage of the circuit may also include an EMI filter (not shown in FIG. 2) at the three-phase input terminals. The common node N of capacitors $C_1$, $C_2$, and $C_3$ is connected to a node between serially-connected switch pairs $S_1$-$S_2$ and $S_3$-$S_4$ and also to a node between split output capacitors $C_{O1}$ and $C_{O2}$. The node between serially-connected switches $S_1$-$S_2$ is connected to output capacitor $C_{O1}$ through clamping diode $D_{C1}$, so that the voltage across switch $S_2$ is clamped to the voltage across capacitor $C_{O1}$, which is preferably one half of output voltage $V_O$. The node between serially-connected switches $S_3$-$S_4$ is connected to output capacitor $C_{O2}$ through clamping diode $D_{C2}$ and the voltage across switch $S_3$ is also clamped to one-half of output voltage $V_O$, preferably. Clamping capacitor $C_C$ is connected across split output capacitors $C_{O1}$ and $C_{O2}$, and is pre-charged to its steady-state average voltage of one-half of the output voltage through the loop consisting of capacitor $C_{O2}$, the body diode of switch $S_2$, pre-charge resistor $R_{PR}$, and a winding of coupled inductor $L_C$. Capacitor $C_R$ which resets the boost inductor currents is connected across serially-connected pairs of switches $S_1$-$S_2$ and $S_3$-$S_4$, and is decoupled from output voltage $V_O$ by inductor $L_C$. The average voltage across capacitor $C_R$ is equal to output voltage $V_O$ since the average voltage across the windings of $L_C$ is zero. The voltages across switches $S_1$ and $S_4$ are clamped to the difference in voltage across capacitor $C_R$ and $C_C$ by the body diodes of switch $S_4$ and switch $S_1$. Since this difference in voltage is equal to one-half of output voltage $V_O$, the voltage across each of the four switches $S_1$-$S_4$ in the circuit in FIG. 2 is one-half of output voltage $V_O$. Generally, any kind of switch that is capable of conducting current in both directions and blocking voltage in one direction with an antiparallel diode (e.g., a MOSFET or an IGBT) is suitable for this application.

The Y-connected capacitors $C_1$, $C_2$, and $C_3$ create virtual ground node N, i.e., a node with the same electrical potential as the input (source) voltage neutral wire that is not physically available or connected in a three-wire power system. By connecting virtual neutral node N directly to the nodes between switch pairs $S_1$-$S_2$ and $S_3$-$S_4$, decoupling of the three input currents is achieved. In such a decoupled circuit, the current in each of boost inductors $L_1$, $L_2$ and $L_3$ depends only on the corresponding phase voltage, which reduces the THD and increases the PF. Specifically, in the circuit in FIG. 2, bridge diodes $D_1$-$D_6$ allow only a positive input voltage to deliver currents through series connected switches $S_1$ and $S_2$ when these switches are turned on and a negative input voltage to deliver currents through series connected switches $S_3$ and $S_4$ when these switches are turned on. The switches may each be turned on at a substantially zero voltage across the switches. Therefore, any boost inductor in a phase with a positive voltage half-line cycle carries positive current when switches $S_1$ and $S_2$ are on, while any boost inductor in a phase with a negative voltage half-line cycle carries negative current when switches $S_3$ and $S_4$ are turned on. During the time when switches $S_1$ and $S_2$ are turned off, the stored energy in the boost inductor connected to the positive phase voltage is delivered to capacitor $C_R$, while the stored energy in the boost inductor connected to the negative phase voltage is delivered to capacitor $C_R$ during the time when switches $S_3$ and $S_4$ are turned off.

Because in every switching cycle the voltage across capacitor $C_R$ changes rapidly (i.e., with a large dV/dt value), coupled inductor $L_C$ connects between "flying" capacitor $C_R$ and output voltage $V_O$ to isolate output voltage $V_O$ from these fast high-voltage transitions that usually produce unacceptable common-mode EMI noise. With coupled inductor $L_C$, the output common-mode noise is very low, as the noise is confined to the $S_1$-$S_2$-$S_3$-$S_4$-$C_R$ loop. Moreover, because coupled inductor $L_C$ provides impedance between output voltage $V_O$ and switches $S_1$-$S_4$, parallel or interleaving operations of multiple rectifiers are possible.

Figure 3A:
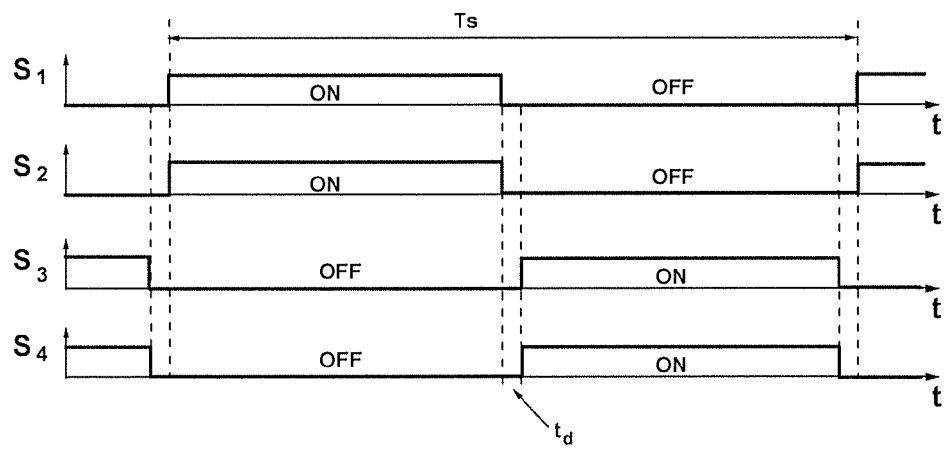
FIGS. 3(a)-3(c) each show, under one of three different control schemes, gating waveforms of switches $S_1$-$S_4$ of FIG. 2 during a switching cycle, according to an embodiment of the present invention.

To achieve a low input-current THD, high PF, and soft-switching of switches $S_1$-$S_4$ over a wise load range, the circuit in FIG. 2 must operate in DCM with a low-bandwidth output-voltage control scheme. This control scheme can be implemented in a variety of ways. FIG. 3(a) shows gating waveforms for controlling switches $S_1$-$S_4$ in FIG. 2 under a variable switching-frequency control scheme. Under the variable-frequency control scheme of FIG. 3(a), switch pairs $S_1$-$S_2$ and $S_3$-$S_4$ are switched in a complementary fashion, with a small dead time $t_d$ between their commutation instants to enable the switch pair that is about to turn on to achieve ZVS. Since dead time $t_d$ is very small in comparison with switching period $T_S$, the effect of the dead time on the duty cycle is negligible, i.e., the duty cycle of each switch pair is approximately 50%.

Figure 3B:
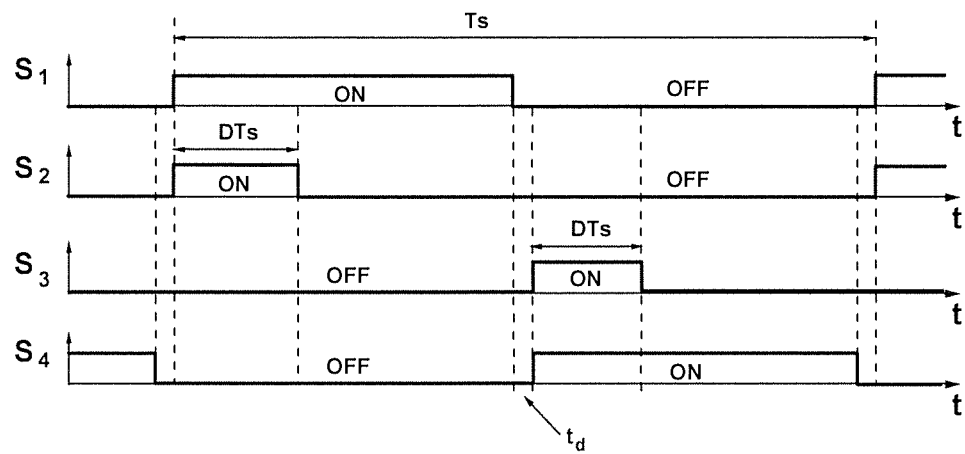

FIG. 3(b) shows a second control scheme for switches $S_1$-$S_4$ of FIG. 2. Under this second control scheme, switches $S_1$ and $S_4$ are switched at a constant frequency in a complementary fashion with a small dead time in-between, i.e., each switch operates at an approximate 50% duty cycle. Switches $S_2$ and $S_3$, whose turn-on instants are synchronized with the turn on instants of $S_1$ and $S_4$, respectively, are each pulse-width modulated to provide regulation of output voltage $V_O$.

Figure 3C:
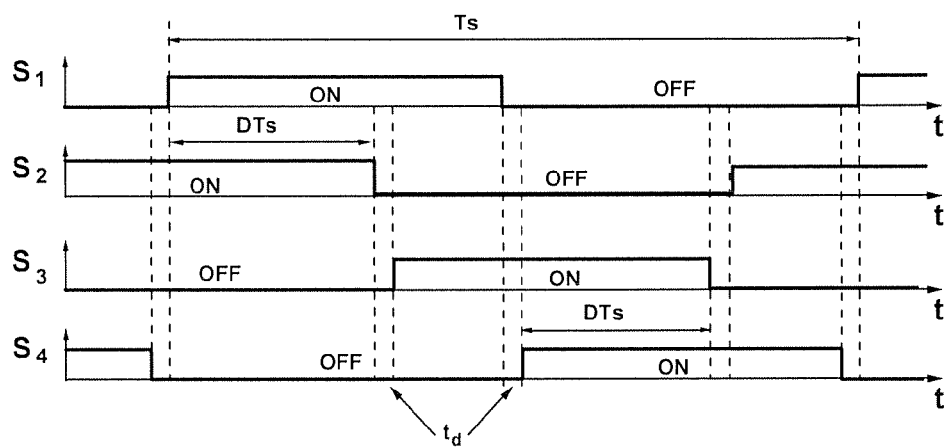

FIG. 3(c) shows a third alternative control scheme for switches $S_1$-$S_4$ of FIG. 2. Under this third control scheme, in each of switch pairs $S_1$-$S_4$ and $S_2$-$S_3$, the switches within the switch pair are switched at a constant frequency in a complementary fashion with a fixed duty cycle of approximately 50%. The control scheme provides a phase shift between the switching instants of the $S_1$-$S_4$ pair and the corresponding switching instants of the $S_2$-$S_3$ pair. In this phase-shift control scheme, the output voltage is zero when the phase shift is zero and reaches a maximum when the phase shift is 180° (i.e., when the phase shift is $T_S/2$).

The control schemes illustrated in FIGS. 3(a)-(c) may be used in a combination. Namely, the variable switching frequency control scheme of FIG. 3(a) can be used in any combination with the constant frequency PWM control scheme of FIG. 3(b), or with the phase-shift control scheme of FIG. 3(c), to limit the switching frequency range. For example, in the output voltage-regulated converter of FIG. 2, the switching frequency increases as the load decreases. Thus, the frequency range can be reduced by a variable switching-frequency control scheme at full and medium loads, while switching over to a constant frequency control scheme at lighter loads.

Figure 4:
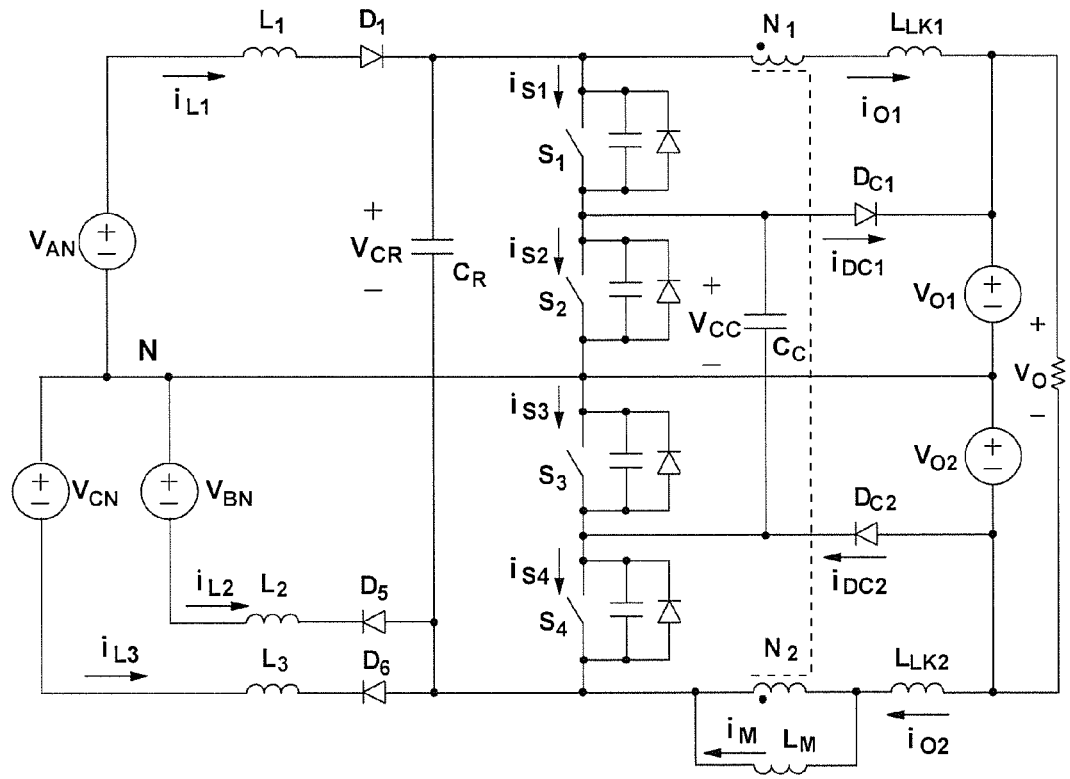
FIG. 4 shows a simplified model of the circuit in FIG. 2, annotated with reference directions of currents and voltages, according to an embodiment of the present invention.

FIG. 4 shows a simplified model of the circuit of FIG. 2, annotated with reference directions of currents and voltages, according to an embodiment of the present invention. To simplify analysis, ripple voltages of the input and output filter capacitors in FIG. 2 (i.e., capacitors $C_1$, $C_2$, $C_3$, $C_{O1}$ and $C_{O2}$) are considered negligible in this model, so that the voltage across the input and output filter capacitors can be represented by constant-voltage source $V_{AN}$, $V_{BN}$, $V_{CN}$, $V_{O1}$, and $V_{O2}$. Also, in the on state, the semiconductor switches exhibit zero resistance (i.e., they are short circuits). However, the output capacitances of the switches are not neglected in this model. Coupled inductor $L_C$ in FIG. 2 is modeled as a two-winding ideal transformer with magnetizing inductance $L_M$ and leakage inductances $L_{LK1}$ and $L_{LK2}$. In this model, the average voltage across flying capacitor $C_R$ is substantially equal to output voltage $V_O=V_{O1}+V_{O2}$ and the average voltage across clamping capacitor $C_C$ is substantially equal to one half of output voltage $V_O$. The reference directions of currents and voltages in FIG. 4 correspond to a 60-degree segment of the line cycle (i.e., when $V_{AN}>0$, $V_{BN}<0$, and $V_{CN}<0$).

Figure 6:
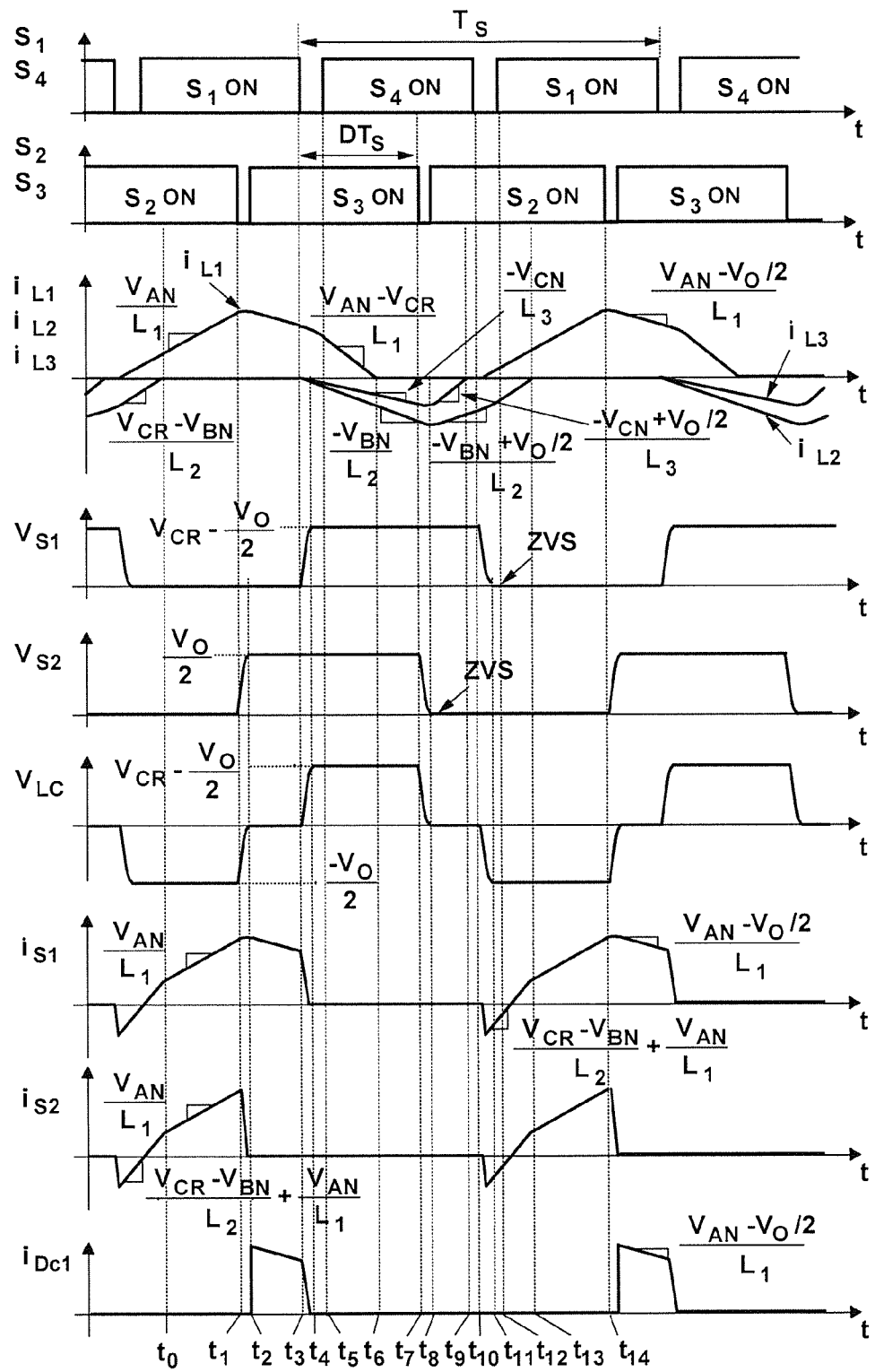
FIG. 6 shows the key waveforms in the model of FIG. 4, according to an embodiment of the present invention.

FIGS. 5(a)-5(n) show topological stages illustrating voltages and currents in the model of FIG. 4 during a switching cycle, according to an embodiment of the present invention. FIG. 6 shows the key waveforms in the model of FIG. 4, according to an embodiment of the present invention.

The waveforms of the gating signals of switches $S_1$-$S_4$ in FIG. 6 show that the control scheme used combines a variable-frequency control scheme and a constant-frequency phase-shift control scheme. In FIG. 6, switches $S_1$ and $S_4$ operate in a complementary manner. Likewise, switches $S_2$ and $S_3$ operate in a complementary manner. In either case, a short dead time is provided between the commutation instants (i.e., each switch operates with a fixed duty cycle of approximately 50%). This gating strategy enable ZVS in the switches that are about to turn on. To regulate output voltage $V_O$ in the presence of input voltage and output load variations, a variable switching frequency control scheme is employed. However, to limit the control-frequency range and the consequential switching losses, the variable-frequency control scheme is assisted by a phase-shift control scheme at light loads or high input voltage, or both.

In the model of FIG. 4, the minimum frequency occurs when both a full load and the minimum input voltage are present, while duty cycle is set substantially at 50%. The maximum frequency occurs when a light load and maximum input voltage are present, while duty cycle is set below 50%. If necessary, the rectifier of the present invention can operate in a controlled burst mode or pulse skip mode at no load or at a very light load, to avoid operation at an unnecessarily high switching frequency. Other control strategies could also be applied to this circuit, including constant-frequency PWM control and phase-shift control as shown in FIGS. 3(b) and 3(c) discussed above.

Referring to FIGS. 5(a) and 6, before switch $S_2$ is turned off at $t=T_1$, inductor current $i_{L1}$ flows through closed switches $S_1$ and $S_2$. The slope of inductor current $i_{L1}$ is equal to $V_{AN}/L_1$ and the peak of the inductor current at $t=T_1$ is approximately $$I_{L1(PK)} = \frac{V_{AN}}{L_1} \times DT_S, \qquad (1)$$

where $V_{AN}$ is line-to-neutral voltage and $DT_S$ is the portion of the switching period $T_S$ during which switches $S_1$ and $S_2$ are both closed (i.e., D is the effective duty cycle). Because the dead time between the turning-off of switch $S_1$ and the turning-on of switch $S_4$ is very short relative to switching period $T_S$, the effect of the dead time is neglected in Equation (1). During the period between times $T_O$ and $T_1$, current $i_{O1}$ decreases at a rate of $-V_{O1}/(L_M+L_{LK1})$ while current $i_{O2}$ increases at a rate of $(V_{CR}-V_{O1})/(L_M+L_{LK2})$. Magnetizing current $i_M$ is the difference between currents $i_{O1}$ and $i_{O2}$.

The magnetizing inductance value of coupled inductor $L_M$ is selected to be sufficiently large, such that its ripple current does not significantly affect rectifier operation. As shown in FIG. 2, the windings of inductor $L_C$ are coupled in such a way as to cancel the magnetic fluxes from the differential current of the two windings, so that the large magnetizing inductance can be achieved by a small gap in the core without saturation. Since the ripples in currents $i_{O1}$ and $i_{O2}$ are considered negligible in this model, further discussion is omitted, although the ripple currents are still shown in the topological stages in FIG. 5.

At $t=T_1$, switch $S_2$ turns off, inductor current $i_{L1}$ begins to charge the parasitic output capacitance of switch $S_2$ (FIG. 5(b)). As the sum of the voltages across switches $S_2$ and $S_3$ is clamped to clamping capacitor voltage $V_{CC}$, the output capacitance of switch $S_3$ discharges at the same rate as the output capacitance of switch $S_2$ is being charged until the output capacitance of switch $S_2$ is fully charged and clamping diode $D_{C1}$ starts to conduct at $t=T_2$, as shown in FIG. 5(c) and FIG. 6. Shortly after $t=T_2$, switch $S_3$ turns on under ZVS condition.

During interval $[T_2, T_3]$, because clamping diode $D_{C1}$ is forward biased, inductor current $i_{L1}$ linearly decreases. The slope of inductor current $i_{L1}$ is equal to $(V_{AN}-V_{O1})/L_1$ and the inductor current at $t=T_3$ is approximately $$I_{L1}|_{t=T3} = \frac{V_{AN} - (1-2D)V_{O1}}{2L_1} \times T_S, \qquad (2)$$

At $t=T_3$, when switch $S_1$ turns off, inductor current $i_{L1}$ begins charging the output capacitance of switch $S_1$, as shown in FIG. 5(d). Because the sum of the voltages across switches $S_1$ and $S_4$ is clamped to the voltage difference between flying capacitor voltage $V_{CR}$ and clamping capacitor voltage $V_{CC}$, the output capacitance of switch $S_4$ discharges at the same rate as the output capacitance of switch $S_1$ is charged, until the output capacitance of switch $S_4$ is fully discharged and the anti-parallel body diode of switch $S_4$ starts to conduct at $t=T_4$, as shown in FIG. 5(e) and FIG. 6. At $t=T_5$, switch $S_4$ turns on a ZVS condition and inductor current $i_{L1}$ is commutated from the antiparallel body diode of switch $S_4$ to the switch, as illustrated in FIG. 5(f). Because the body diode of switch $S_4$ is forward biased and switch $S_3$ is switched on, inductor currents $i_{L2}$ and $4_3$ begin to linearly increase after $t=T_4$. At $t=T_5$, switch $S_4$ turns on under a ZVS condition and inductor currents $i_{L2}$ and $i_{L3}$ are commutated from the antiparallel body diode of switch $S_4$ to the switch, as illustrated in FIG. 5(f), until inductor current $i_{L1}$ decreases to zero at $t=T_6$. To maintain DCM operation, the minimum voltage $V_{CR\,(MIN)}$ across "flying" capacitor $C_R$, which is equal to output voltage $V_O$, is provided by:

$$V_{CR(MIN)} = \frac{V_{AN(PK)}}{1-D} = \frac{\sqrt{2}}{\sqrt{3}(1-D)} \times V_{L-L,RMS} \qquad (3)$$

where $V_{AN-PK}$ is the peak line-to-neutral voltage.

During the $T_4$-$T_6$ interval, because inductor currents $i_{L2}$ and $i_{L3}$ both flow in an opposite direction from inductor current $i_{L1}$, the average current through switches $S_3$ and $S_4$ is reduced, resulting in reduced power losses in the switches.

During the period between $t=T_6$ and $t=T_7$, inductor currents $i_{L2}$ and $i_{L3}$ continue to flow through switches $S_3$ and $S_4$, as illustrated in FIG. 5(g). As shown in FIG. 6, the slopes of inductor currents $i_{L2}$ and $i_{L3}$ during this period are equal to $-V_{BN}/L_2$ and $-V_{CN}/L_3$, respectively. The peaks of the inductor currents at the moment when switch $S_3$ turns off at $t=T_7$ are approximately $$I_{L2(PK)} = -\frac{V_{BN}}{L_2} \times DT_S \text{ and} \qquad (3)$$

$$I_{L3(PK)} = -\frac{V_{CN}}{L_3} \times DT_S. \qquad (4)$$

Therefore, as seen from Equations (1), (3), and (4), the peak inductor current is proportional to its corresponding input voltage, as long as duty cycle D is substantially constant during one half of the line cycle.

After switch $S_3$ turns off at $t=T_7$, inductor currents $i_{L2}$ and $i_{L3}$ start to simultaneously charge the output capacitance of switch $S_3$ and discharge the output capacitance of switch $S_2$, as shown in FIG. 5(h), until $t=T_8$, when the output capacitance of switch $S_3$ is fully charged and clamping diode $D_{C2}$ starts to conduct at $t=T_8$, as shown in FIG. 5(i) and FIG. 6. After $t=T_8$, switch $S_2$ turns on under a ZVS condition.

At time $t=T_8$, because clamping diode $D_{C2}$ is forward biased, inductor currents $i_{L2}$ and $i_{L3}$ begin to linearly increase until inductor current $i_{L3}$ reaches zero at time $t=T_9$. The slopes of inductor currents $i_{L2}$ and $i_{L3}$ are equal to $(-V_{BN}+V_{O2})/L_2$ and $(-V_{CN}+V_{O2})/L_3$, respectively. Inductor current $i_{L2}$ at $t=T_{10}$, when switch $S_4$ turns off, is approximately $$I_{L2}|_{t=T10} = \frac{-V_{BN} + (1-2D)V_{O2}}{2L_2} \times T_S. \quad (5)$$

At $t=T_{10}$, when switch $S_4$ turns off, inductor current $i_{L2}$ starts to charge the output capacitance of switch $S_4$, as shown in FIG. 5(k). Because the sum of the voltages across switches $S_1$ and $S_4$ is clamped to the voltage difference between flying capacitor voltage $V_{CR}$ and clamping capacitor voltage $V_{CC}$, the output capacitance of switch $S_1$ discharges at the same rate as the output capacitance of switch $S_4$ is being charged, until the output capacitance of switch $S_1$ is fully discharged and the anti-parallel body diode of switch $S_1$ starts to conduct at $t=T_{11}$, as shown in FIG. 5(l) and FIG. 6. At $t=T_{12}$, switch $S_1$ turns on under a ZVS condition and inductor currents $i_{L2}$ is commutated from the antiparallel body diode of switch $S_1$ to the switch itself, as shown in FIG. 5(m). At this time, because switches $S_1$ and $S_2$ are both on, inductor current $i_{L1}$ begins to linearly increase after $t=T_{11}$. During period $T_{12}$-$T_{13}$, increasing inductor current $i_{L2}$, continues to flow through switches $S_1$ and $S_2$, as shown in FIG. 5(m). Finally, after inductor current $i_{L2}$ reaches zero at $t=T_{13}$, a new switching cycle begins, as shown in FIG. 5(n).

The harmonic content of the average inductor currents $i_{L1}$-$i_{L3}$ shown in FIG. 6 is dominated by the $3^{rd}$ harmonic. However, as the neutral wire in a three-wire power system is not available (or not connected), the phase currents cannot contain the triplen harmonics (the $3^{rd}$ harmonic and the odd multiples of the 3rd harmonic). As a result, the circuit of the present invention exhibits a very low THD and a high PF, as the remaining harmonics contribute less than 1-2% of total current distortion.

Figure 7:
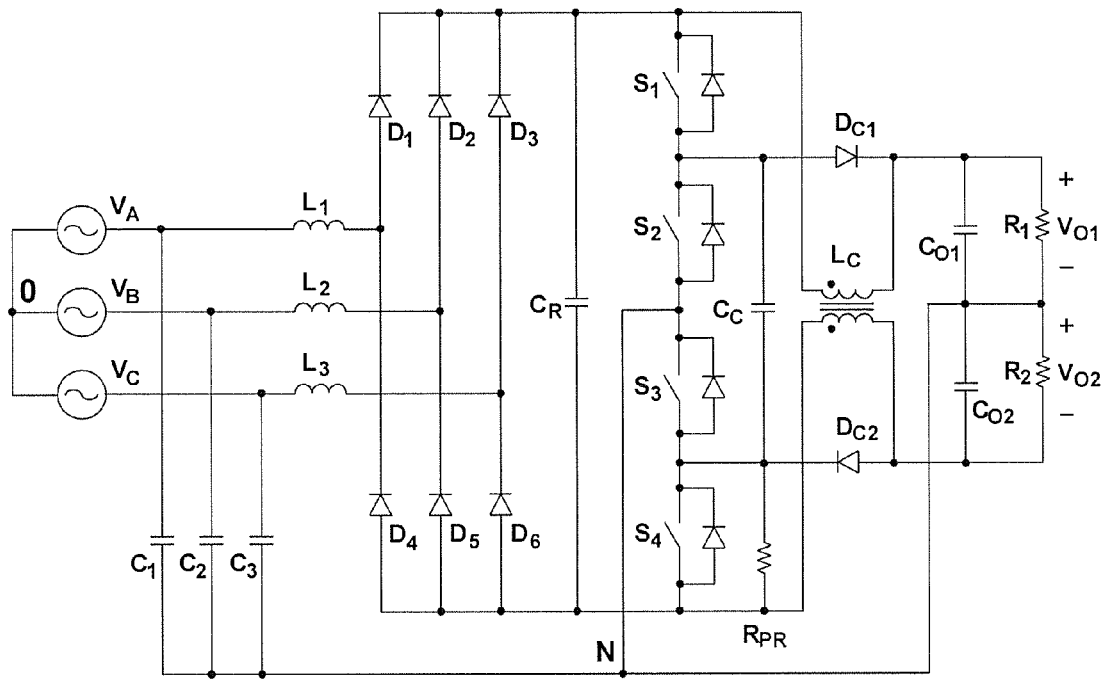
FIG. 7 shows a three-phase three-level ZVS PFC DCM boost rectifier with two independent loads, according to an embodiment of the present invention.

A PFC rectifier of the present invention may be implemented in many ways. For example, FIG. 7 shows an implementation supporting independent loads $R_1$ and $R_2$. Since the two-switch rectifier automatically balances the voltages across output capacitors $C_{O1}$ and $C_{O2}$, no additional voltage-balancing circuit is required. Natural voltage-balancing is achieved because in the circuit in FIG. 7, the average voltages across switch pairs $_{S1}$-$S_2$ and $S_3$-$S_4$ are equal to voltages $V_{O1}$ and $V_{O2}$ across capacitors $C_{O1}$ and $C_{O2}$, respectively, as the average voltages across the windings of inductor $L_C$ are zero. The average voltages of switch pairs $S_1$-$S_2$ and $S_3$-$S_4$ are equal to $V_{CR}/2$, so that $V_{O1}=V_{O2}=V_{CR}/2$.

Figure 8:
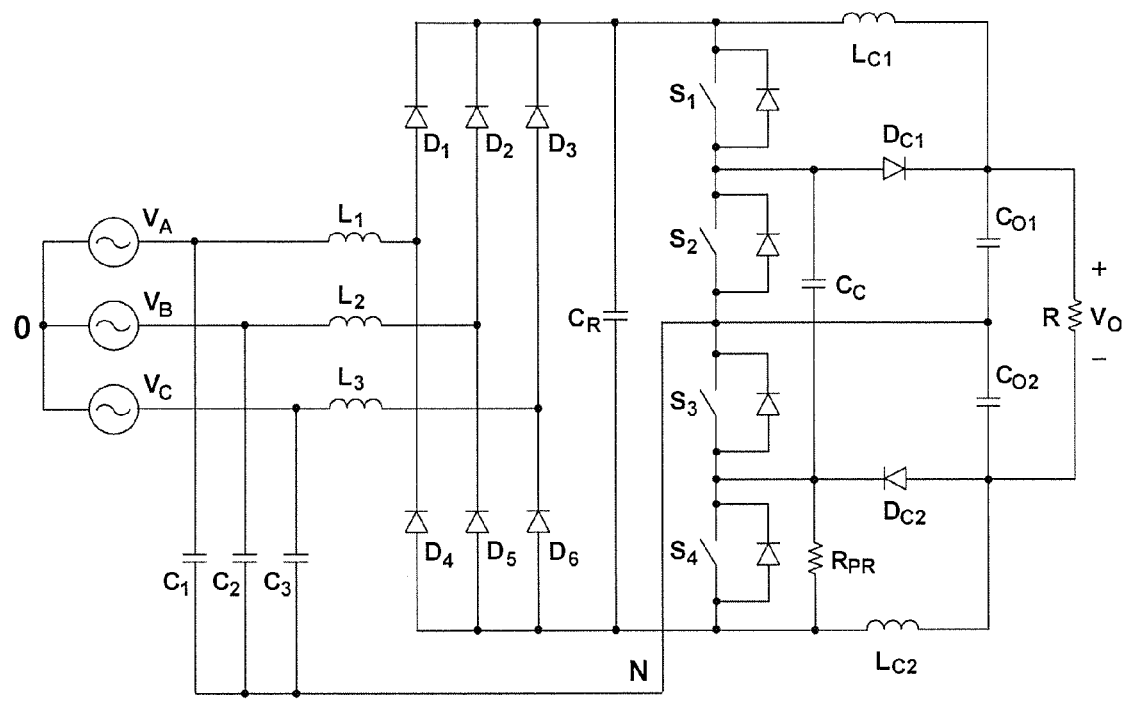
FIG. 8 shows a three-phase three-level ZVS PFC DCM boost rectifier with two independent inductors, according to an embodiment of the present invention.
Figure 9:
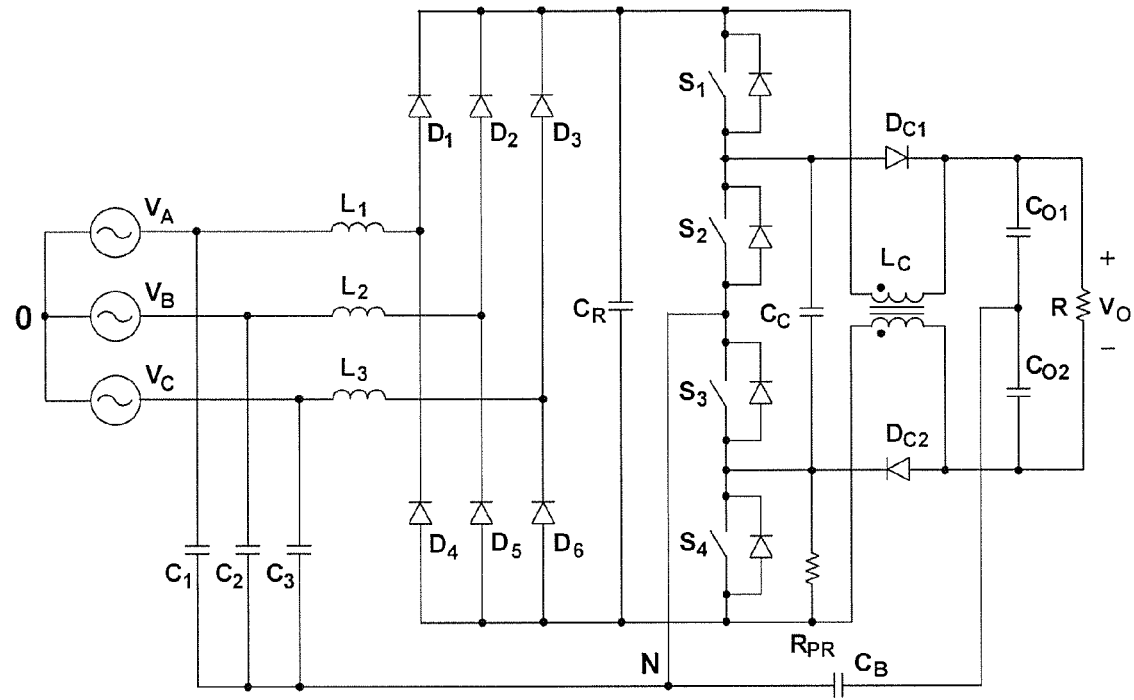
FIG. 9 shows a three-phase three-level ZVS PFC DCM boost rectifier with a blocking capacitor between a virtual neutral node and the node between two split output capacitors, according to an embodiment of the present invention.

Alternatively, the circuits of the present invention may also be implemented using independent inductors $L_{C1}$ and $L_{C2}$, as shown in FIG. 8, or with blocking capacitor $C_B$, as shown in FIG. 9. By coupling blocking capacitor $C_B$ between virtual neutral node N and output capacitors $C_{O1}$ and $C_{O2}$ (FIG. 9), low frequency currents circulating between virtual neutral node N, switches $S_2$ and $S_3$ and the common node between capacitors $C_{O1}$ and $C_{O2}$ can be reduced.

Figure 10:
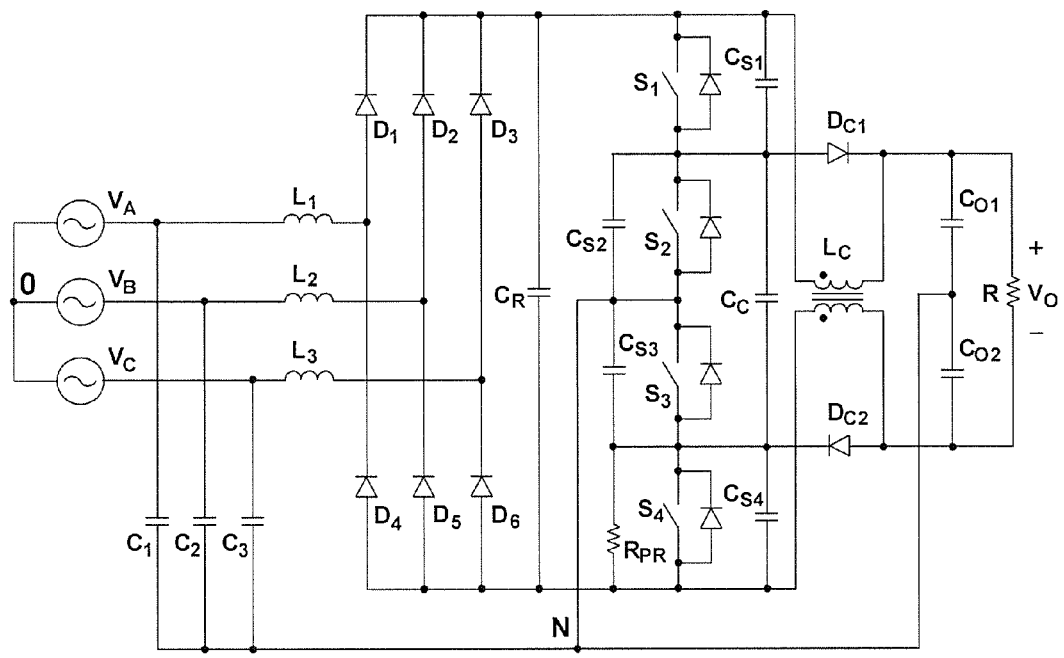
FIG. 10 shows a three-phase three-level ZVS PFC DCM boost rectifier in which snubber capacitors $C_{S1}$, and $C_{S4}$ are connected in parallel to switches $S_1$ and $S_4$, according to one embodiment of the present invention.

FIG. 10 shows an embodiment in which snubber capacitors $C_{S1}$ and $C_{S4}$ are connected in parallel with switches $S_1$ and $S_4$.

By adding snubber capacitors $C_{S1}$ and $C_{S4}$, turn-off losses in switches $S_1$ and $S_4$ can be significantly reduced.

Figure 11:
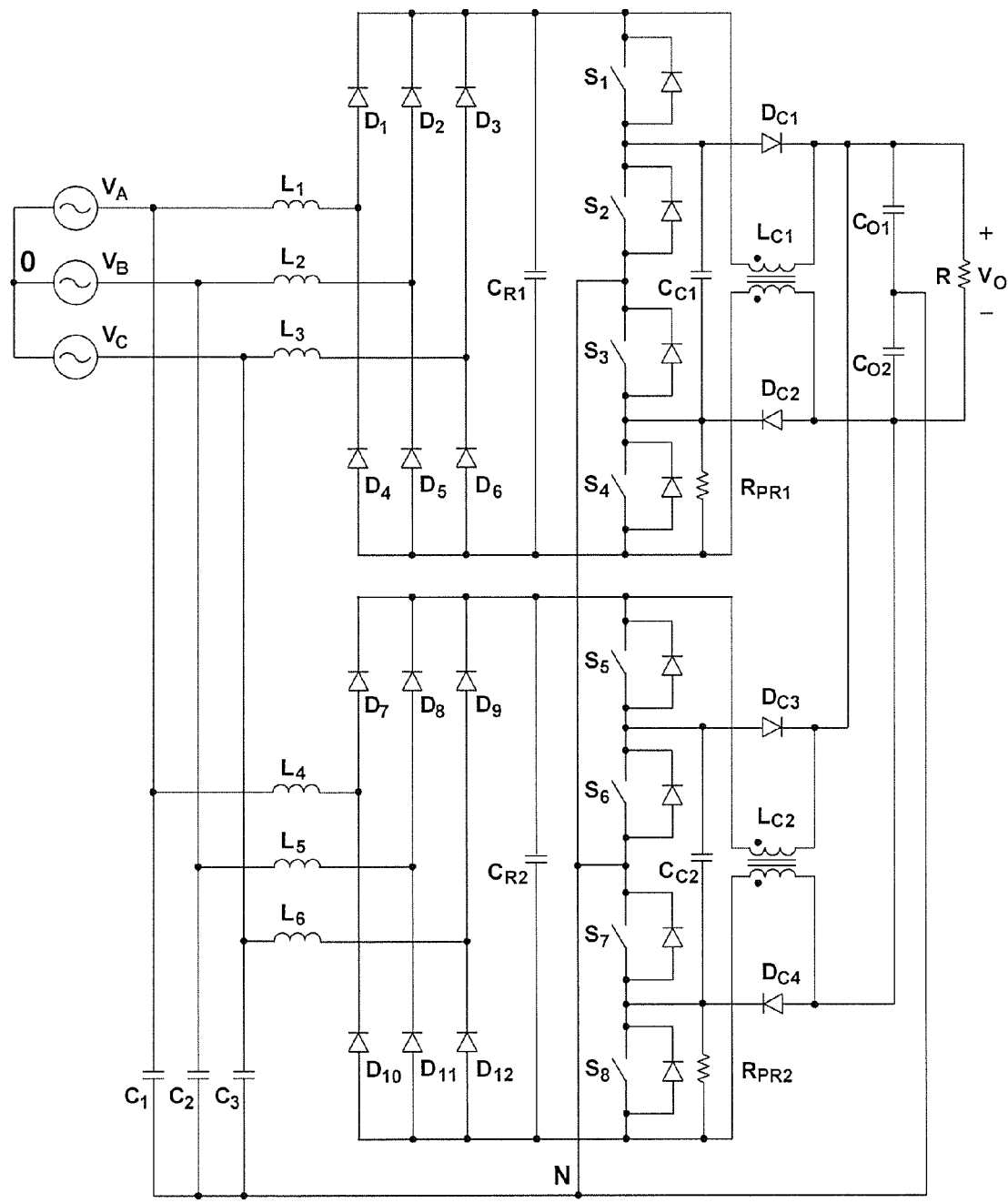
FIG. 11 shows three-phase three-level ZVS PFC DCM boost rectifiers supporting parallel or interleaved operations, according to an embodiment of the present invention.

FIG. 11 shows a circuit of the present invention that combines two sub-circuits ("PFC stages") which operate in parallel or are interleaved, in accordance with one embodiment of the present invention. The PFC stages in FIG. 11 each include an input portion of the circuit similar to that shown in FIG. 2 (from the three-phase input voltage up to coupled inductor $L_C$). In parallel operation, switches $S_1$, $S_2$, $S_5$, and $S_6$ are driven by a first gating signal, while switches $S_3$, $S_4$, $S_7$, and $S_8$ are driven by a second gating signal that is complementary the first gating signal. In an interleaved operation, switches $S_1$, $S_2$, $S_7$, and $S_8$ are driven by the first gating signal, while switches $S_3$, $S_4$, $S_5$, and $S_6$ are driven by the second gating signal. The parallel and interleaved operations are made possible by coupled inductors $L_{C1}$ and $L_{C2}$, which provide decoupling impedances between the output portion and the switches.

Figure 12:
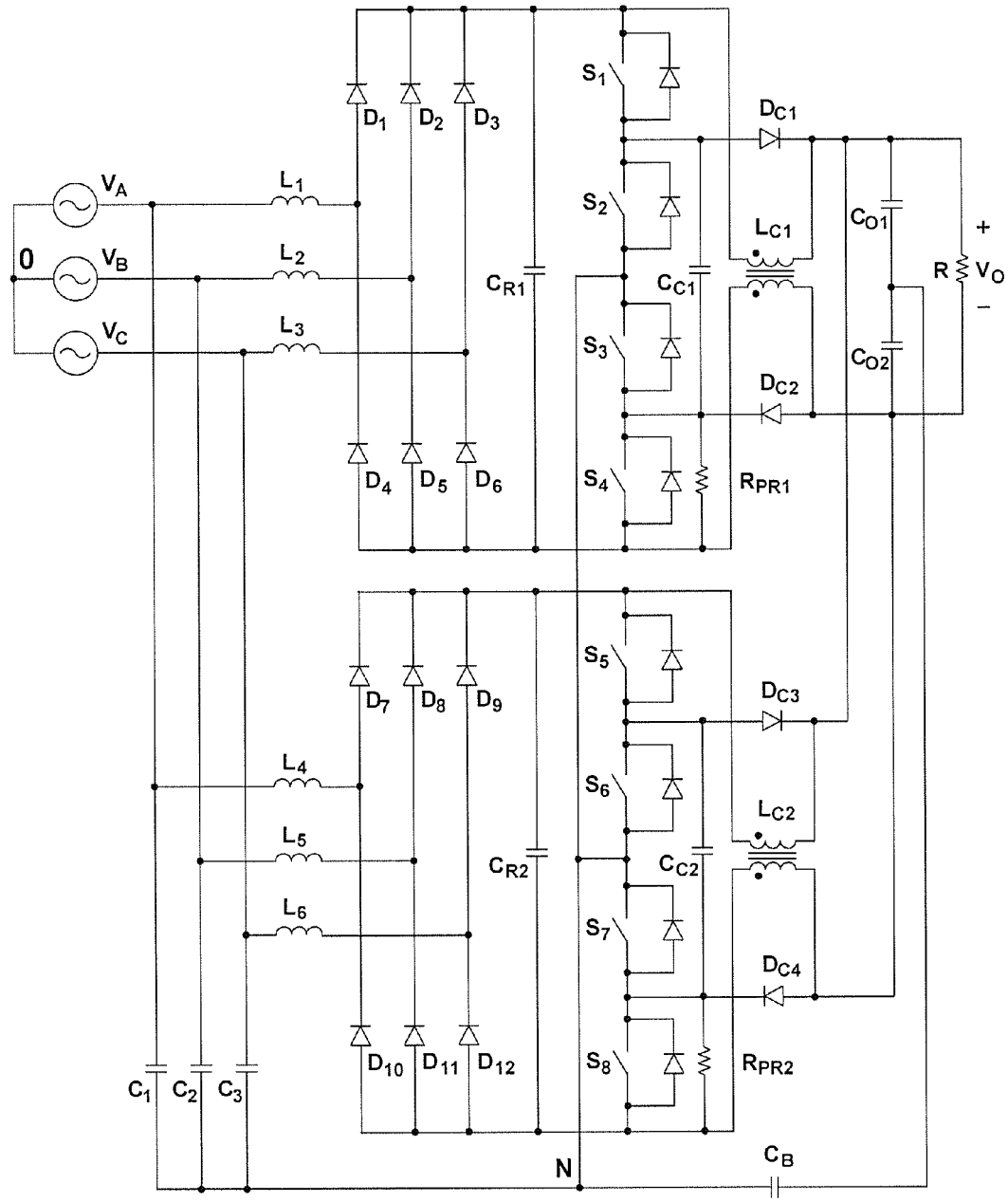
FIG. 12 shows interleaved three-phase three-level ZVS PFC DCM boost rectifiers including DC current blocking capacitor $C_B$, according to an embodiment of the present invention.

FIG. 12 shows an interleaved three-phase three-level ZVS PFC DCM boost rectifier including DC current blocking capacitor $C_B$, according to one embodiment of the present invention. By including blocking capacitor $C_B$, a DC current circulating between the common nodes of switches $S_2$, $S_3$, $S_6$, and $S_7$ and the common node of output capacitors $C_{O1}$ and $C_{O2}$ can be prevented.

Figure 13:
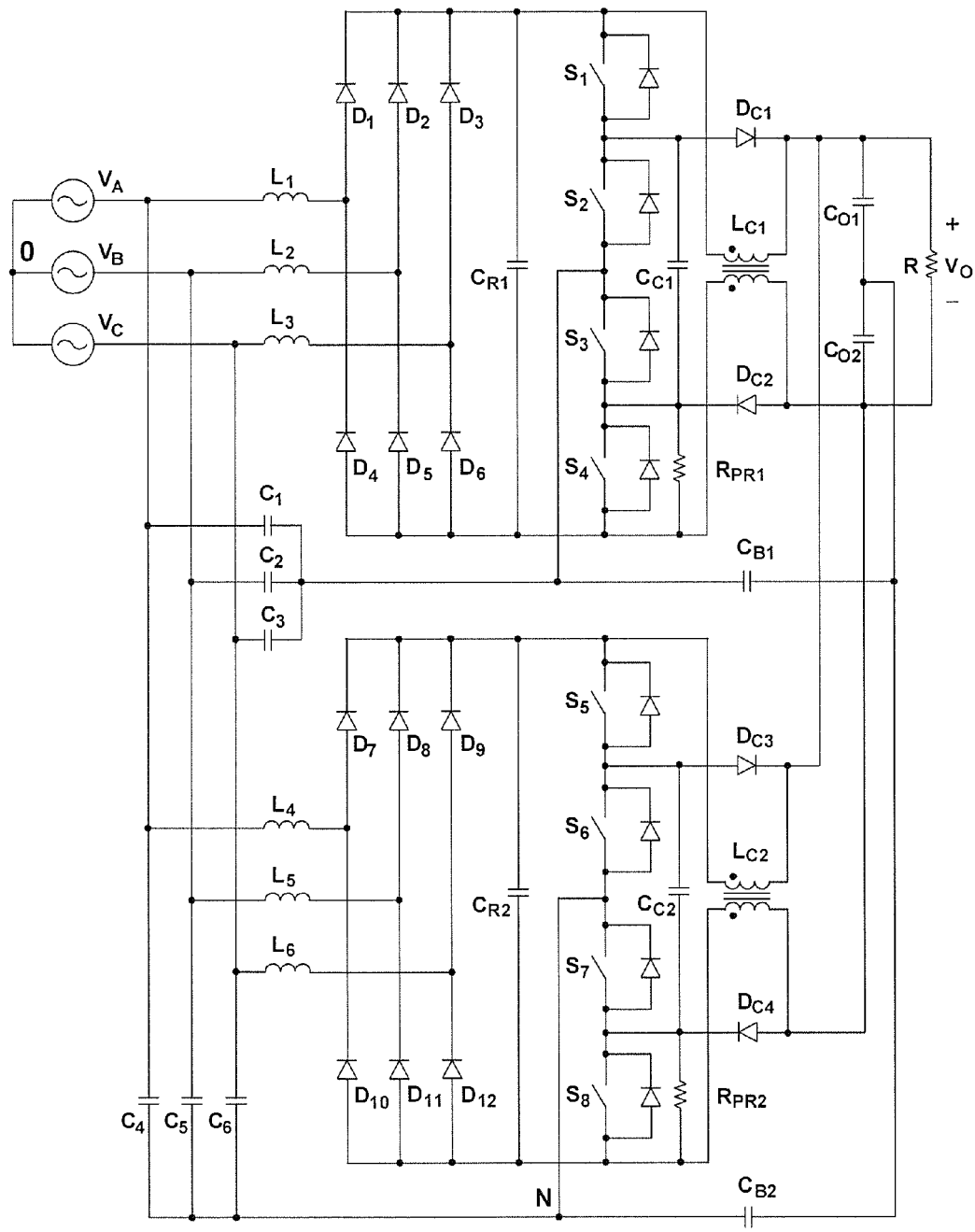
FIG. 13 shows interleaved three-phase three-level ZVS PFC DCM boost rectifiers including DC current blocking capacitors $C_{B1}$ and $C_{B2}$ and input filter capacitor sets $C_1$-$C_3$ and $C_4$-$C_6$, according to an embodiment of the present invention.

FIG. 13 shows an interleaved three-phase three-level ZVS PFC DCM boost rectifier including DC current blocking capacitors $C_{B1}$ and $C_{B2}$ and input filter capacitor sets $C_1$-$C_3$ and $C_4$-$C_6$, according to one embodiment of the present invention.

Figure 14:
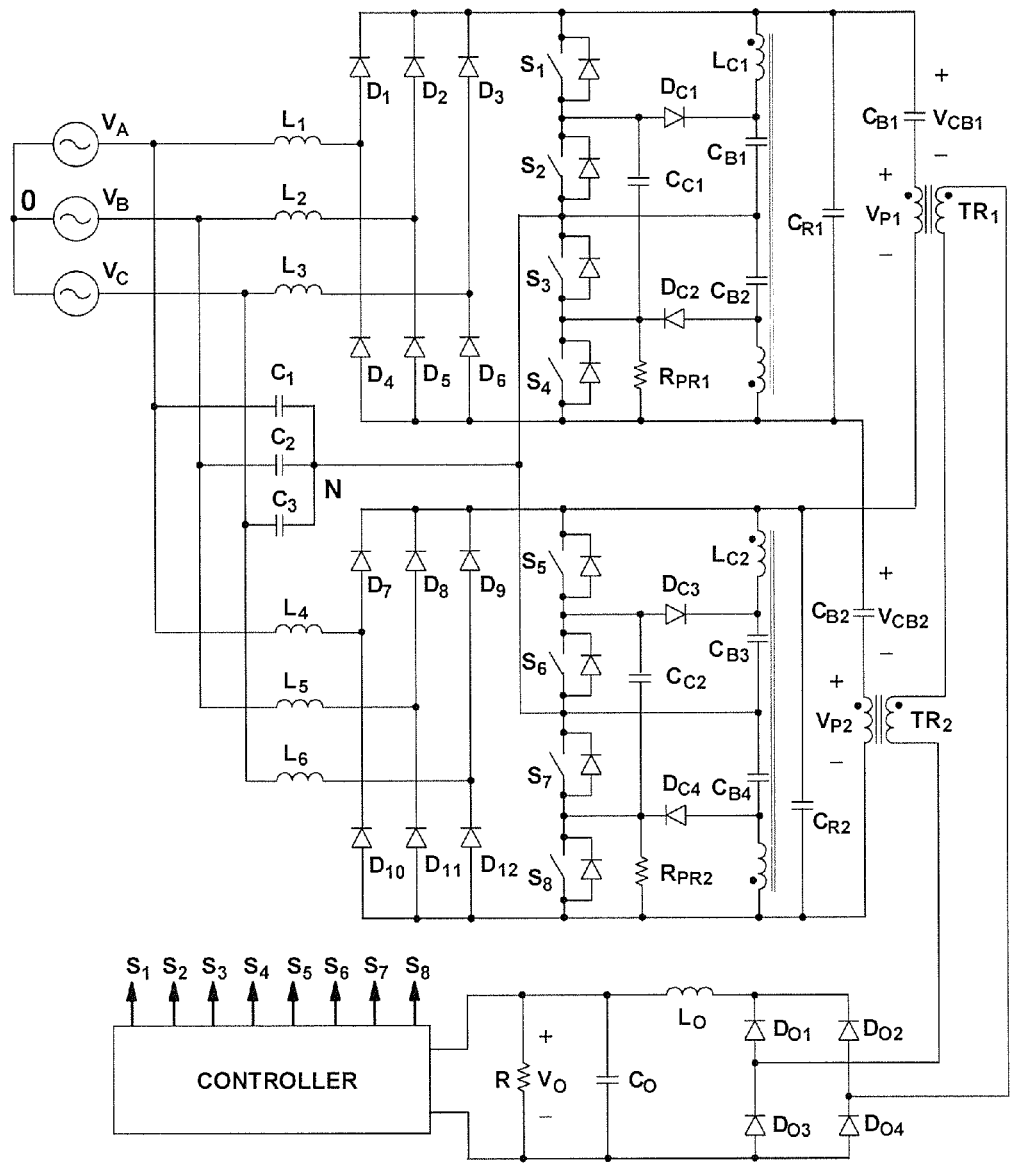
FIG. 14 shows a three-phase three-level single-stage isolated ZVS PFC DCM boost rectifier with two transformers and an additional phase-shift control scheme, according to an embodiment of the present invention.

FIG. 14 shows three-phase three-level single-stage isolated ZVS PFC DCM boost rectifier including transformers $TR_1$ and $TR_2$ and an additional phase-shift control scheme. A tightly controlled output voltage can be achieved without additional switches, when two isolated PFC rectifiers are connected in parallel. As shown in FIG. 14, transformers $TR_1$ and $TR_2$ replace coupled inductors $L_{C1}$ and $L_{C2}$ of FIG. 13. On the secondary side of transformers $TR_1$ and $TR_2$, rectifiers $D_{O1}$-$D_{O4}$ and the output filter formed by inductor $L_O$ and capacitor $C_O$ are coupled between the serially-connected secondary windings of transformers $TR_1$ and $TR_2$ and output voltage $V_O$. Furthermore, using an additional phase-shift or PWM control scheme, the isolated circuits connected to the primary windings of transformers $TR_1$ and $TR_2$ can tightly control the output voltages to minimize unnecessary voltage ripples.

Figure 15:
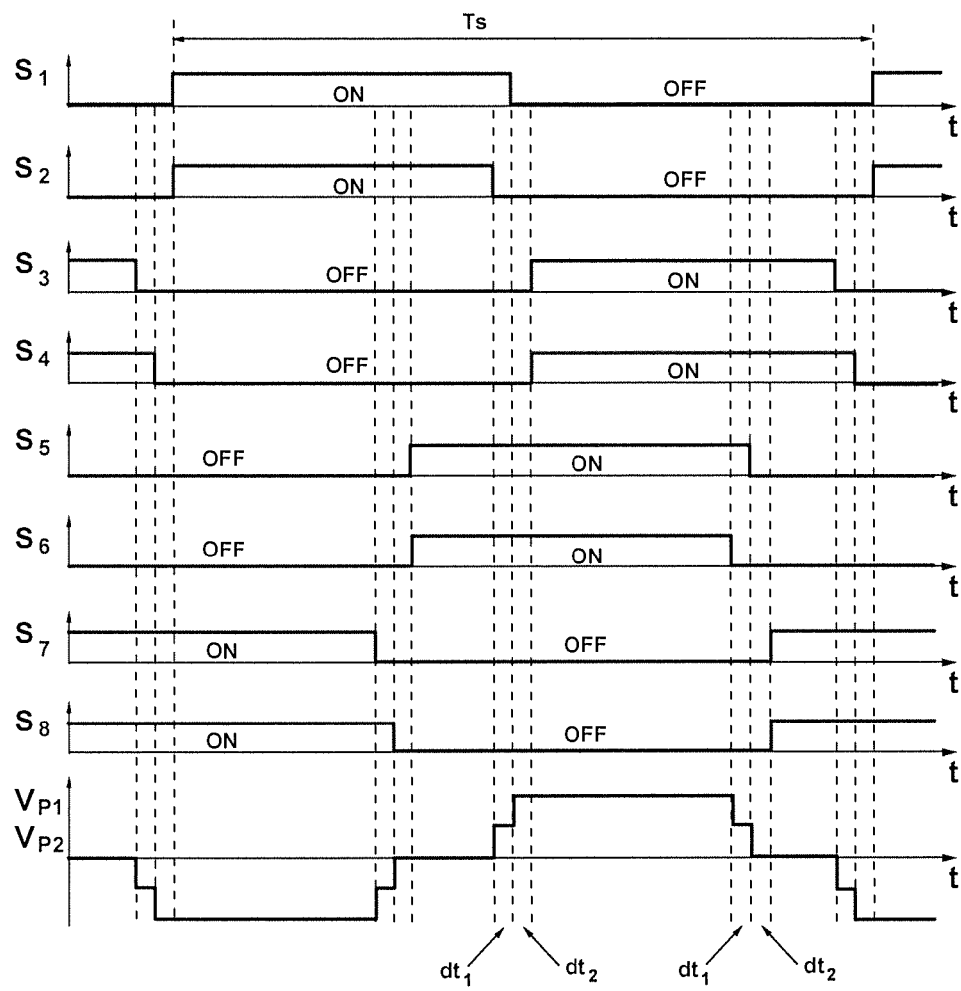
FIG. 15 shows gating waveforms of switches $S_1$-$S_8$ of the circuit in FIG. 14 during a switching cycle, according to an embodiment of the present invention.

FIG. 15 shows gating waveforms of switches $S_1$-$S_8$ for the circuit of FIG. 14. Switches $S_1$ and $S_2$ of the first PFC stage turn on before switches $S_7$ and $S_8$ of the second PFC stage turn off. This phase shift between the two set of switches creates PWM voltage waveforms $V_{P1}$ and $V_{P2}$ across the primary windings of transformers $TR_1$ and $TR_2$, as shown in FIG. 15. Switches $S_2$, $S_3$, $S_6$, and $S_7$ turn off slightly earlier than switches $S_1$, $S_4$, $S_5$, and $S_8$ turn off, which ensures that the switch voltages be clamped to one-half of the output voltage $V_O$. Switches $S_1$-$S_8$ operate with a slowly varying switching frequency and near 50% duty cycle to achieve high PF and low THD, while the phase shift is used to tightly regulate the output voltage.

Figure 16:
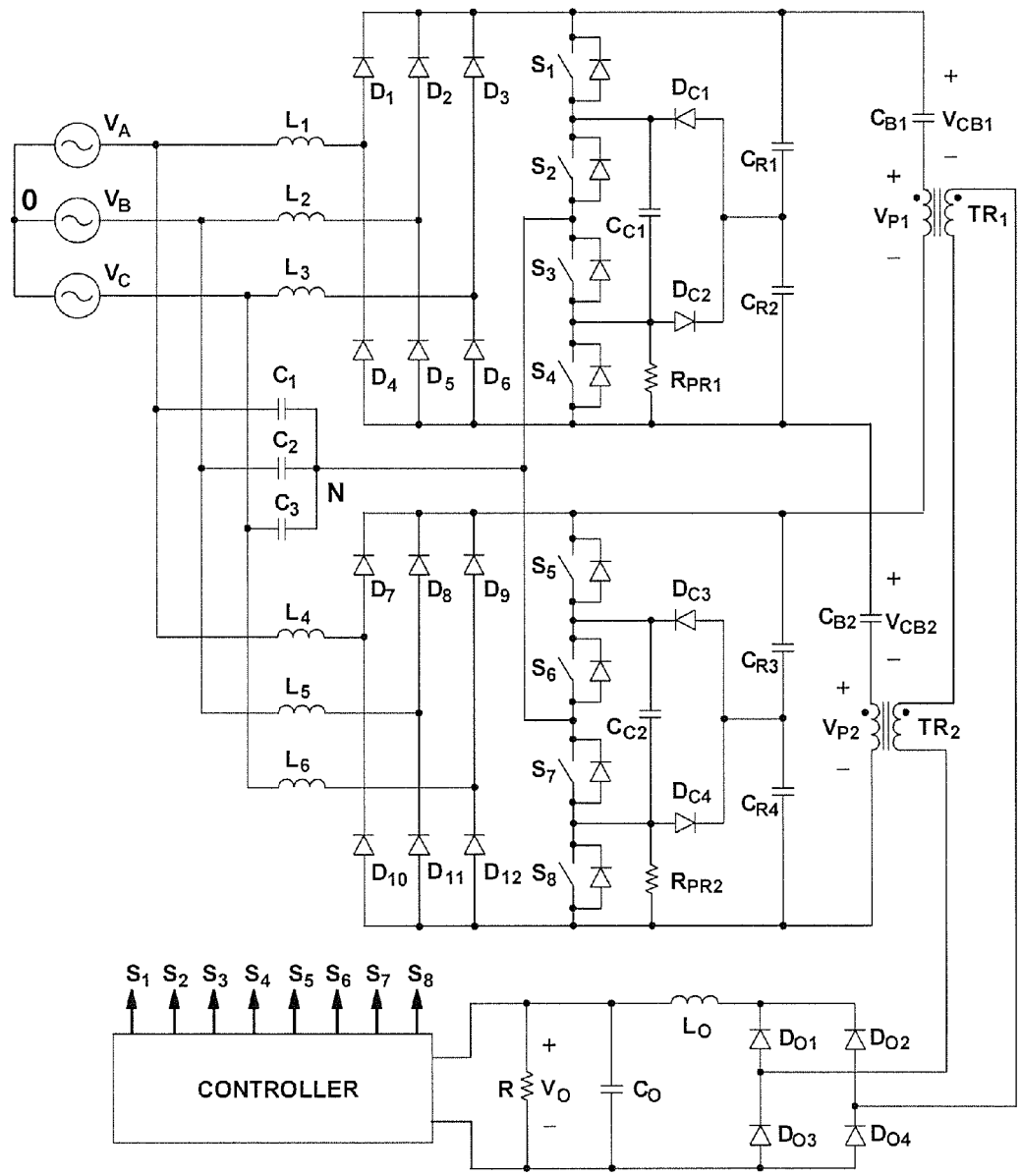
FIG. 16 shows another three-phase three-level single-stage isolated ZVS PFC DCM boost rectifiers with two transformers and an additional phase-shift control scheme, according to an embodiment of the present invention.

FIG. 16 shows another three-phase three-level single-stage isolated ZVS PFC DCM boost rectifier with two transformers and an additional phase-shift control scheme. The circuit of FIG. 16 is implemented using clamping diodes $D_{C1}$ and $D_{C2}$ that connect both the node between switches $S_1$ and $S_2$ and the node between switches $S_3$ and $S_4$ to the common node between split flying capacitors $C_{R1}$ and $C_{R2}$, so as to clamp the voltages across switches $S_1$ and $S_4$, respectively. The circuit of FIG. 16 is also implemented with the secondary windings of transformers $TR_1$ and $TR_2$ connected in series to provide current sharing.

Figure 17:
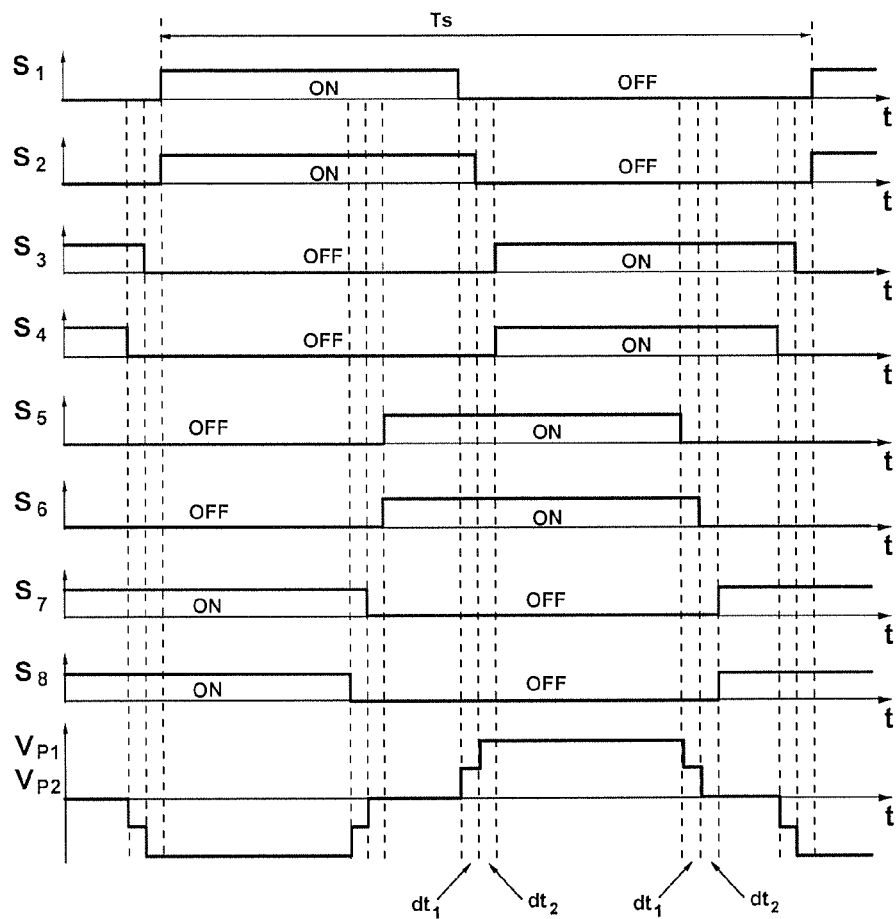
FIG. 17 shows gating waveforms of switches $S_1$-$S_8$ of the circuit in FIG. 16 during a switching cycle, according to an embodiment of the present invention.

FIG. 17 shows gating waveforms of switches $S_1$-$S_8$ for the circuit in FIG. 16. Switches $S_1$ and $S_2$ of the first PFC stage turn on before switches $S_7$ and $S_8$ of the second PFC stage turn off. The phase shift between the two switching instants creates PWM voltage waveforms $V_{P1}$ and $V_{P2}$ across the primary windings of transformers $TR_1$ and $TR_2$, as shown in FIG. 17. Switches $S_1$, $S_4$, $S_5$, and $S_8$ turn off slightly earlier than switches $S_2$, $S_3$, $S_6$, and $S_7$ turn off, which ensures that the switch voltages are clamped to one-half of output voltage $V_O$.

Generally, most off-line power supplies of today have two cascaded stages—a front-end PFC rectifier stage and an output isolated dc-dc converter stage. As a result, although the output voltage of the front-end PFC rectifier contains rectified line frequency voltage ripples, the secondary isolated dc-dc converter stage can regulate its output voltage by its own high-frequency bandwidth feedback control. A single-stage approach combines the functions of the two cascaded stages. As a result, a single-stage rectifier should achieve PFC as well as tight regulation of the output voltage.

Figure 18:
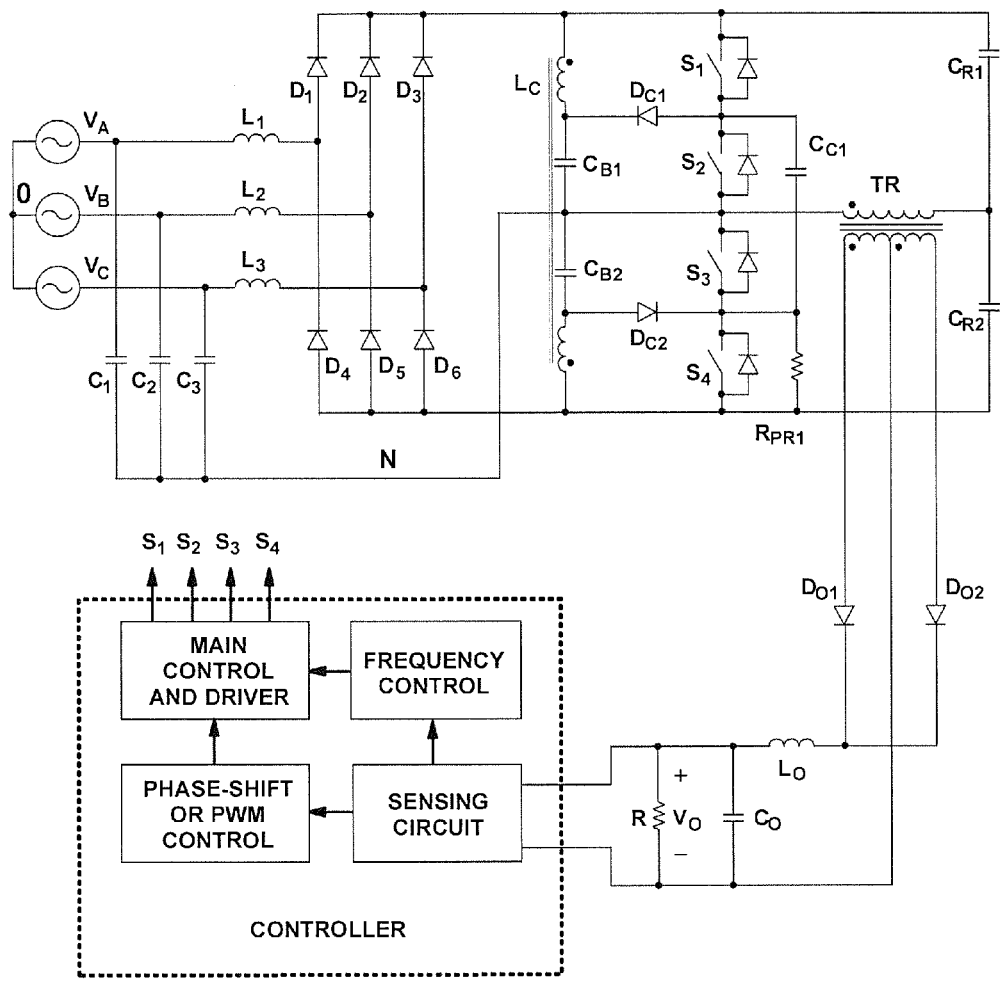
FIG. 18 shows a three-phase three-level single-stage isolated ZVS PFC DCM boost rectifier with transformer TR and split flying capacitors $C_{R1}$ and $C_{R2}$, according to an embodiment of the present invention.

FIG. 18 shows a single-stage rectifier with an isolated output. The primary side of the isolated circuit of FIG. 18 is similar to the circuit of FIG. 2, except that the circuit in FIG. 18 includes flying capacitors $C_{R1}$ and $C_{R2}$ and additional transformer TR that has a primary winding and a center-tap secondary winding. On the secondary side of transformer TR, rectifiers $D_{O1}$ and $D_{O2}$ and output filter components $L_O$ and $C_O$ are coupled between the secondary winding of transformer TR and output voltage $V_O$. To achieve high PF and low THD, the switching frequency of switches $S_1$-$S_4$ are kept nearly constant during a half cycle of the line frequency. To keep the switching frequency substantially constant, a low-pass filter may be included in the path of the frequency-control feedback loop. As a result, the bandwidth of the frequency control feedback loop is lower than the line frequency, which produces significant voltage ripples across flying capacitor $C_{R1}$ and $C_{R2}$ at rectified line frequency (e.g., six times higher frequency than the fundamental frequency of the line). However, a tight regulation of the output voltage is achieved by an additional a high-pass filter in the path of the phase-shift or PWM high-band-width control feedback loop.

Figure 19:
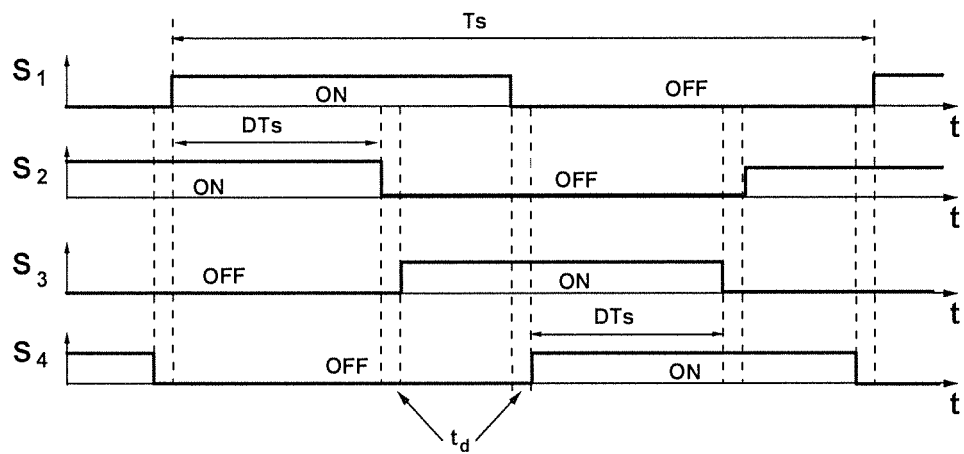
FIG. 19 shows gating waveforms of switches $S_1$-$S_4$ in the circuit of FIG. 18 during a switching cycle, according to an embodiment of the present invention.

FIG. 19 shows gating waveforms of switches $S_1$-$S_4$ for the circuit of FIG. 18. The gating signals of switches $S_1$ and $S_4$ are phase shifted with respect to the corresponding gating signals of switches $S_2$ and $S_3$. This phase shift creates PWM voltage waveforms across the primary windings of transformer TR. Switches $S_1$-$S_4$ operate with a slowly varying switching frequency and near 50% duty cycle to achieve high PF and low THD, while the variation of the phase shift is used to tightly regulate the output voltage.

Figure 20:
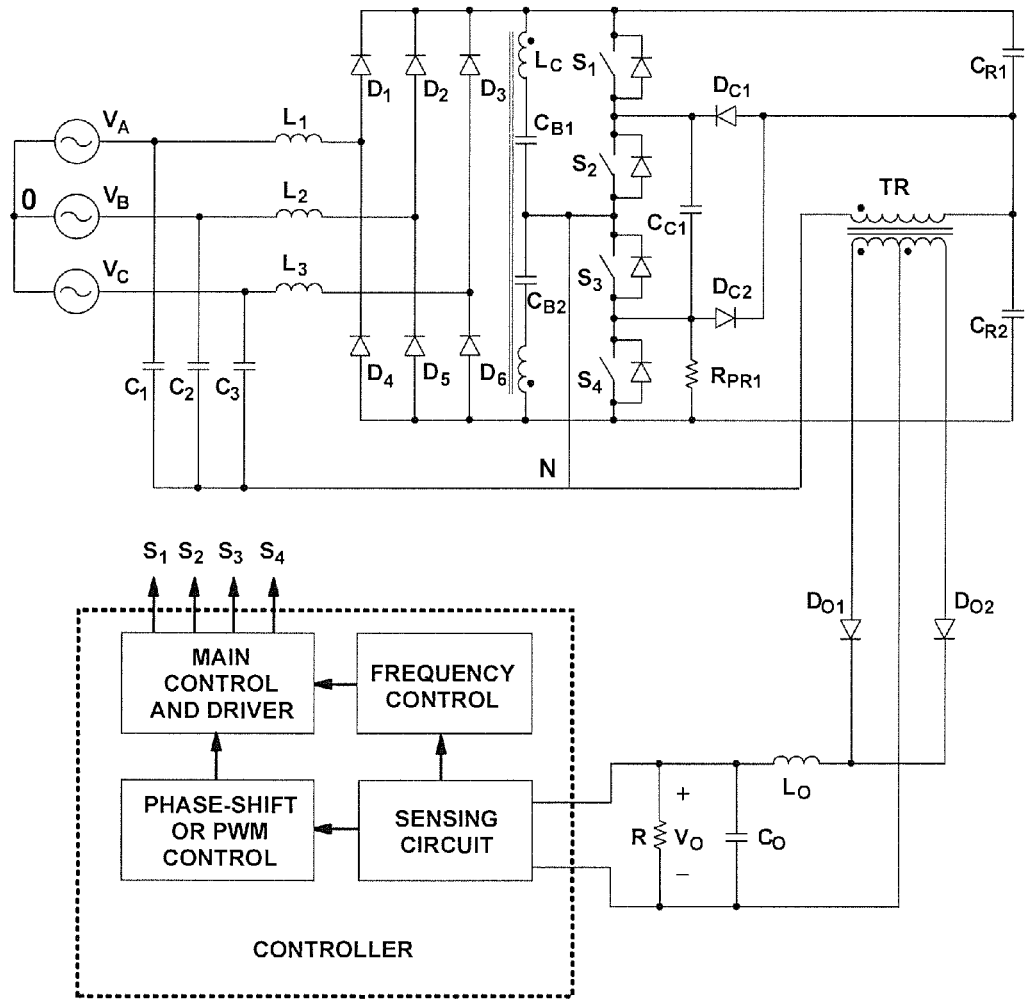
FIG. 20 shows a three-phase three-level single-stage isolated ZVS PFC DCM boost rectifier with a transformer and clamping diodes coupled to a node between split flying capacitors, according to an embodiment of the present invention.

FIG. 20 shows another three-phase, three-level single-stage isolated ZVS PFC DCM boost rectifier with a transformer and an additional phase-shift control scheme. The circuit is implemented by connecting clamping diodes $D_{C1}$ and $D_{C2}$ to the node between split flying capacitors $C_{R1}$ and $C_{R2}$, so as to clamp the voltages across switches $S_1$ and $S_4$, respectively.

Figure 21:
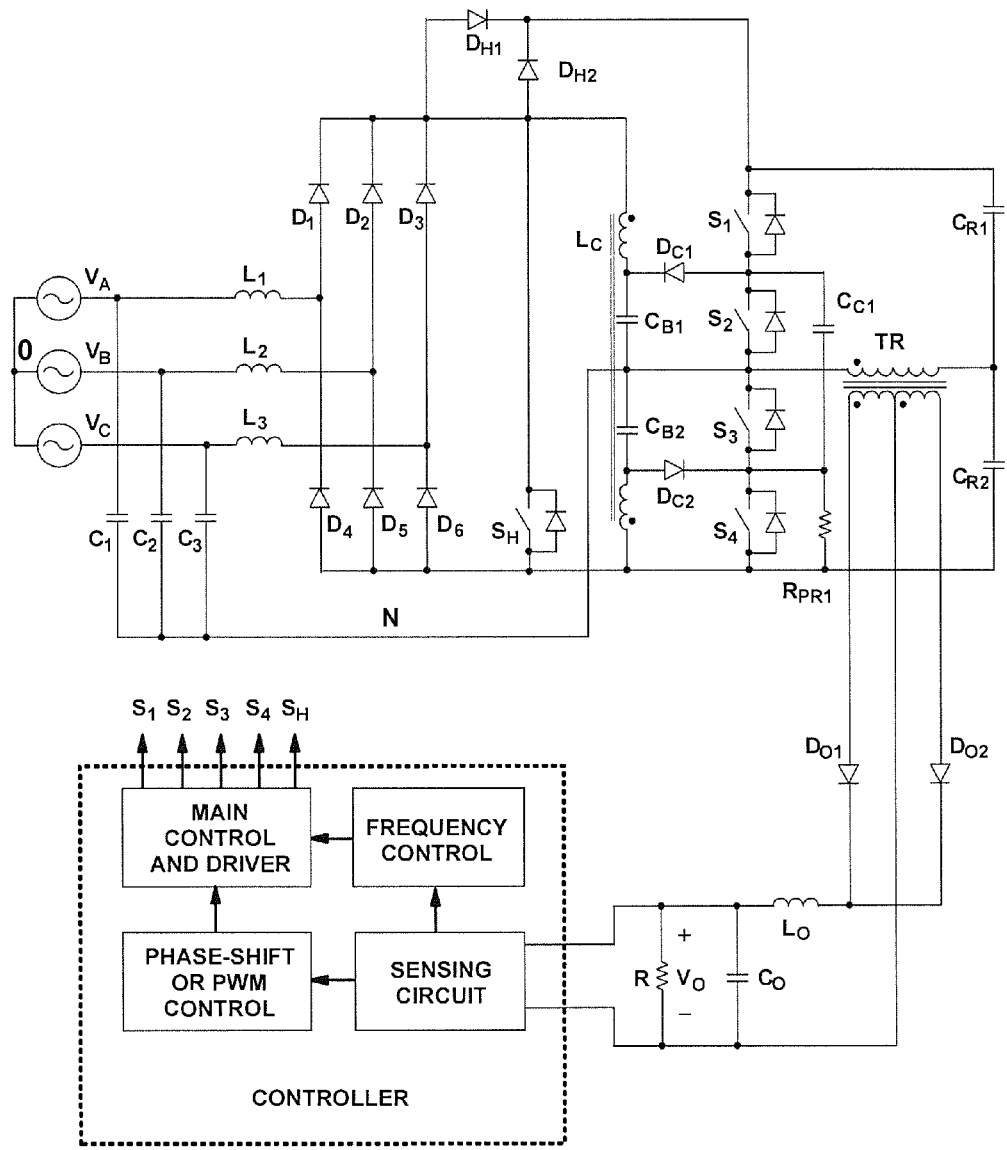
FIG. 21 shows a three-phase three-level single-stage isolated ZVS PFC DCM boost rectifier with an auxiliary boost converter that uses the leakage inductances of the coupled inductor as auxiliary boost inductors, according to an embodiment of the present invention.

FIG. 21 shows yet another three-phase three-level single-stage isolated ZVS PFC DCM boost rectifier with an auxiliary boost converter that consists of switch $S_H$ and diodes $D_{H1}$ and $D_{H2}$. The leakage inductances of coupled inductor $L_C$ serve as a boost inductor for the auxiliary boost converter. The auxiliary boost converter begin operating immediately after the tree-phase input voltage goes to zero, to extend the output voltage regulation time.

Figure 22:
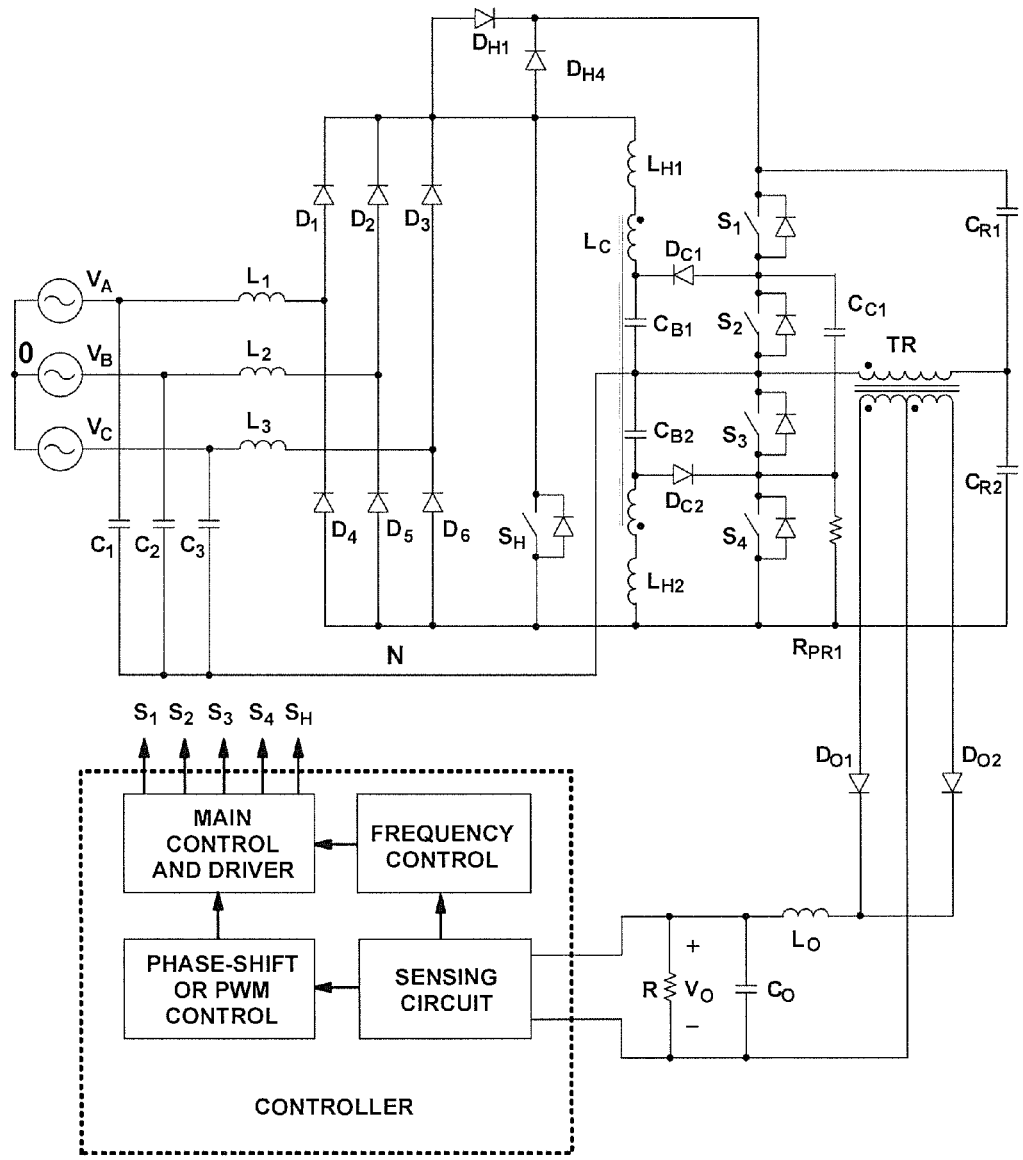
FIG. 22 shows a three-phase three-level single-stage isolated ZVS PFC DCM boost rectifier with an auxiliary boost converter having auxiliary boost inductors $L_{H1}$ and $L_{H2}$, according to an embodiment of the present invention.

FIG. 22 shows another three-phase three-level single-stage isolated ZVS PFC DCM boost rectifier with an auxiliary boost converter that consists of switch $S_H$, diodes $D_{H1}$ and $D_{H2}$, and auxiliary boost inductors $L_{H1}$ and $L_{H2}$.

Figure 23:
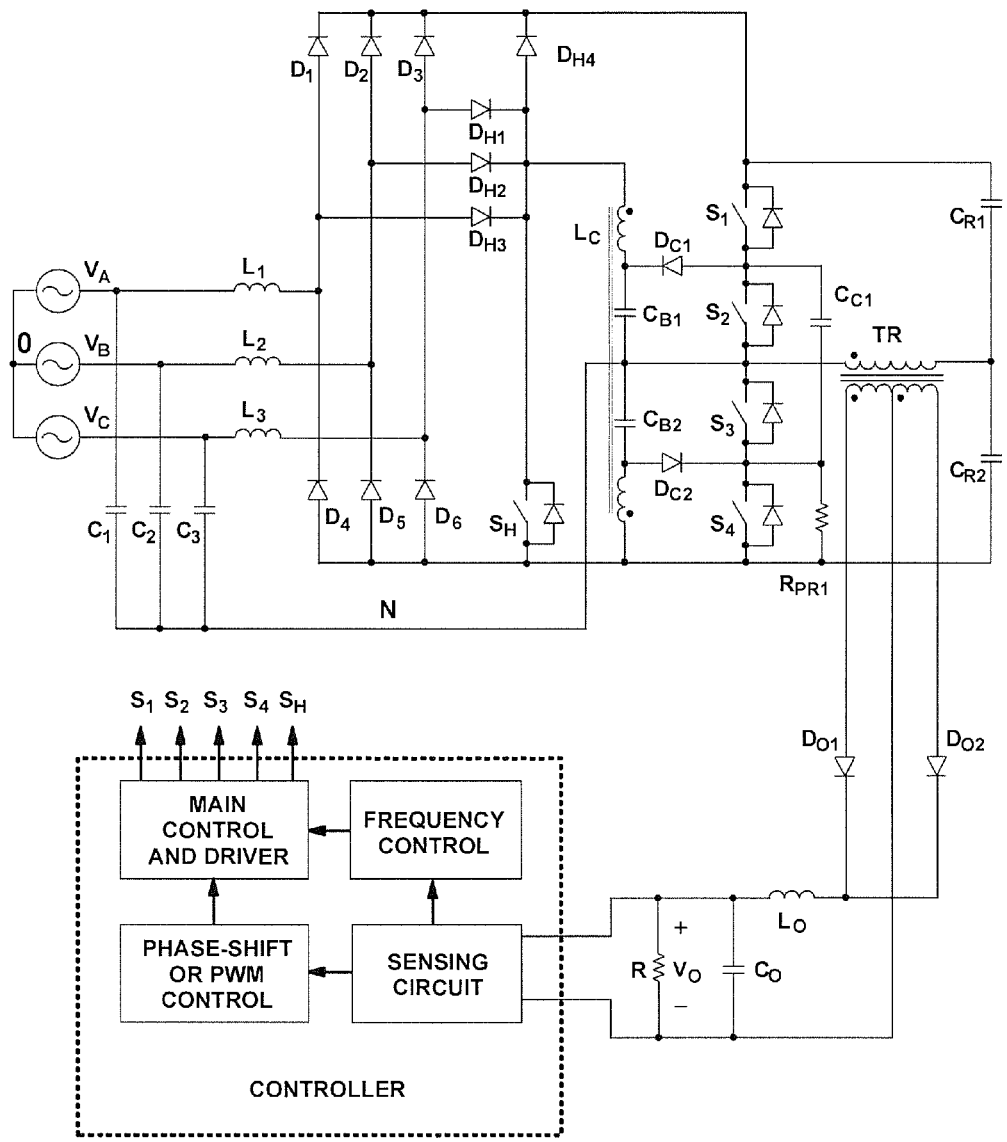
FIG. 23 shows another three-phase three-level single-stage isolated ZVS PFC DCM boost rectifier with an auxiliary boost converter that uses the leakage inductances of the coupled inductor as auxiliary boost inductors, according to an embodiment of the present invention.

FIG. 23 shows yet another three-phase three-level single-stage isolated ZVS PFC DCM boost rectifier with an auxiliary boost converter that consists of switch $S_H$, diodes $D_{H1}$-$D_{H3}$, and auxiliary boost inductors $L_{H1}$ and $L_{H2}$. In FIG. 23, series diode $D_{H1}$ of FIG. 22 that connects between input bridge diodes $D_1$-$D_3$ and switch $S_1$ has been eliminated. This approach is desirable for applications that require high efficiency operation. The leakage inductances of coupled inductor $L_C$ serve as a boost inductor of the auxiliary boost converter.

Figure 24:
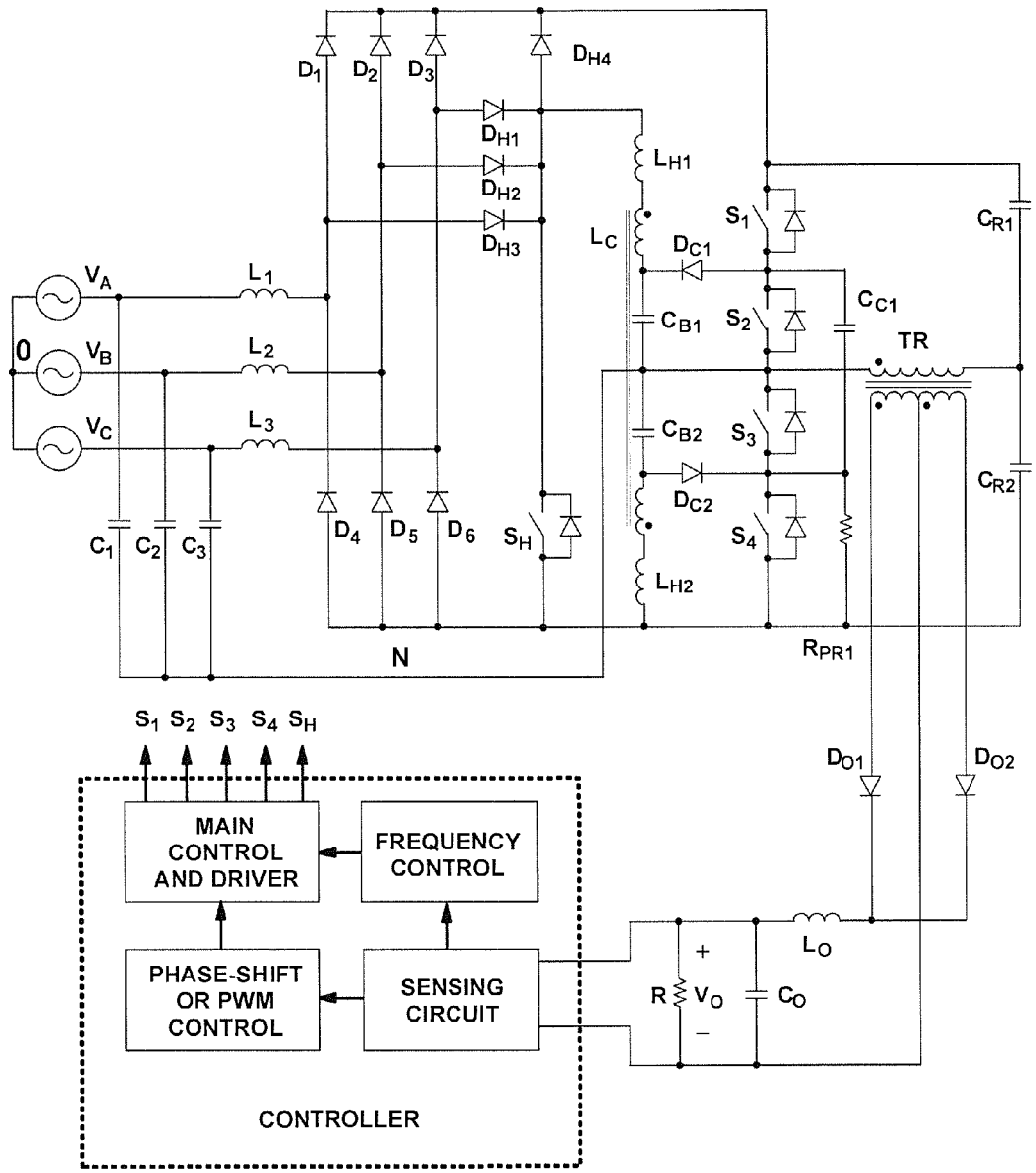
FIG. 24 shows yet another three-phase three-level single-stage isolated ZVS PFC DCM boost rectifier with an auxiliary boost converter having auxiliary boost inductors $L_{H1}$ and $L_{H2}$, according to an embodiment of the present invention.

FIG. 24 shows another three-phase three-level single-stage isolated ZVS PFC DCM boost rectifier with an auxiliary boost converter that consists of switch $S_H$, diodes $D_{H1}$-$D_{H4}$, and auxiliary boost inductors $L_{H1}$ and $L_{H2}$.

Figure 25:
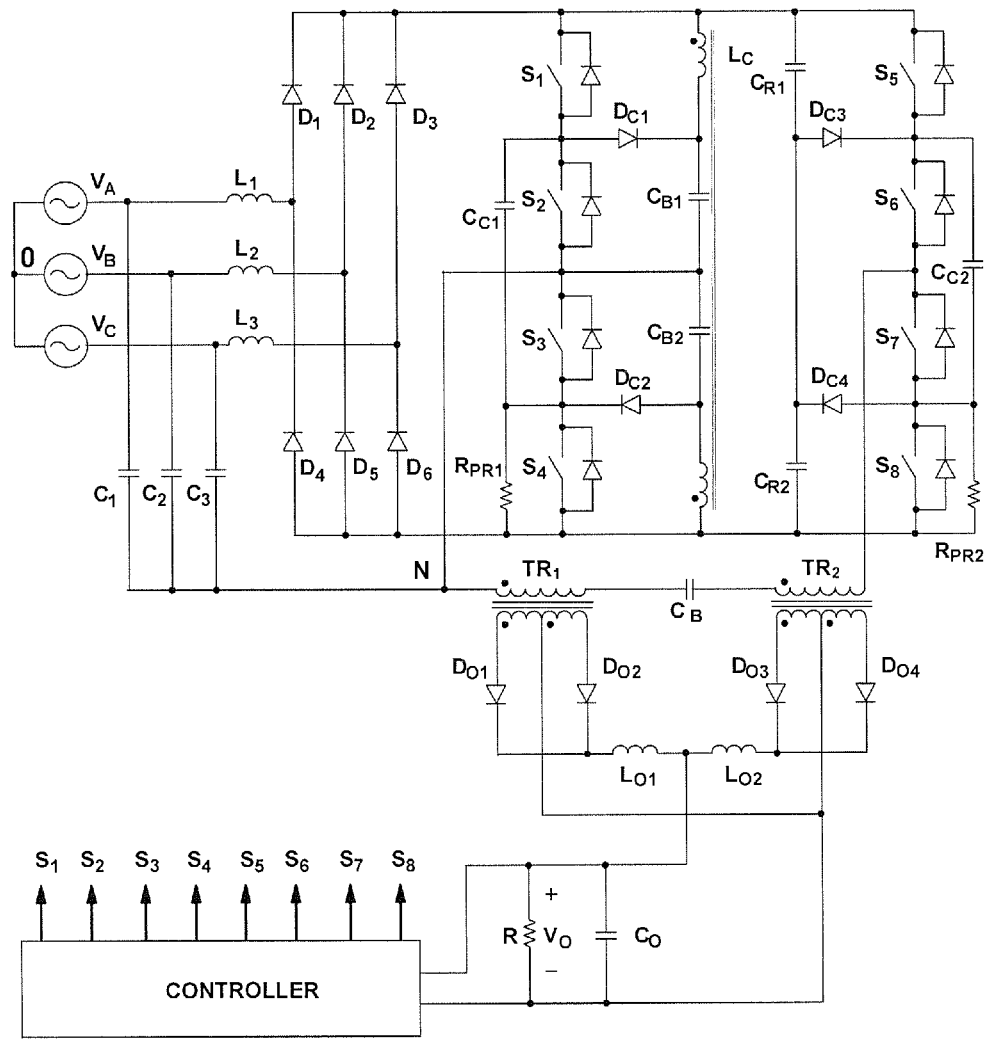
FIG. 25 shows a three-phase three-level single-stage isolated ZVS PFC DCM boost rectifier with a full-bridge primary configuration and transformers $TR_1$ and $TR_2$, according to an embodiment of the present invention.

FIG. 25 shows a three-phase three-level single-stage isolated ZVS PFC DCM boost rectifier with switches $S_1$-$S_8$ and an isolated output, according to one embodiment of the present invention. The primary side of the isolated circuit in FIG. 25 is similar to the circuit of FIG. 2, except that the circuit has split flying capacitors $C_{R1}$ and $C_{R2}$, auxiliary switches $S_5$-$S_8$, additional clamping diodes $D_{C3}$ and $D_{C4}$, and series connected transformers $TR_1$ and $TR_2$ each consisting of a primary winding and a center-tap secondary winding. On the secondary side of transformers $TR_1$ and $TR_2$, rectifiers $D_{O1}$-$D_{O4}$ and output filter components $L_{O1}$, $L_{O2}$ and $C_O$ are coupled between the secondary windings of transformers $TR_1$ and $TR_2$ and the output. Blocking capacitor $C_B$ is connected in series with transformers $TR_1$ and $TR_2$ to eliminate any DC current through the primary windings of the transformers. The controller operates main switches $S_1$-$S_4$ and auxiliary switches $S_5$-$S_8$ to achieve frequency and phase-shift control, using the gating signal waveforms in FIGS. 15 and 17. The isolated single-stage implementation can achieve a tight control of its output voltage in addition to high PF and low THD.

Figure 26:
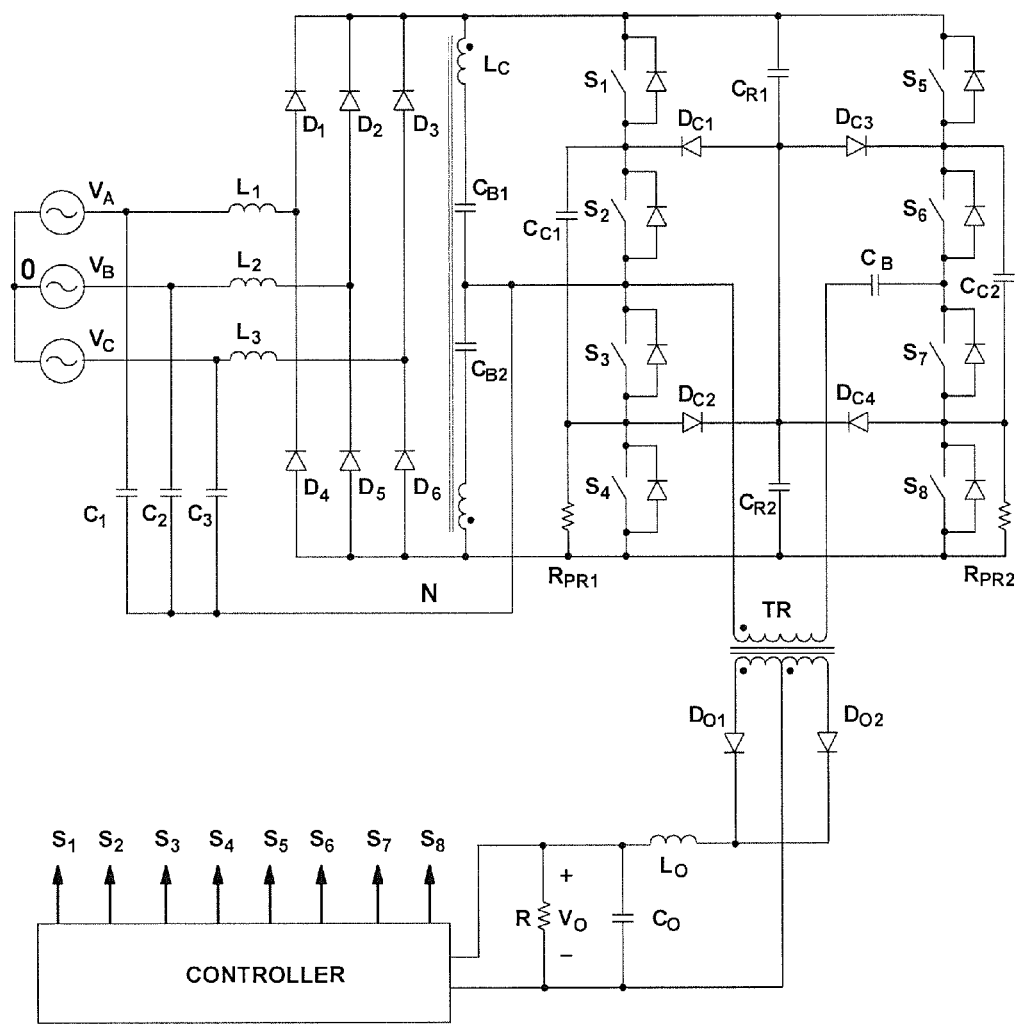
FIG. 26 shows another three-phase three-level single-stage isolated ZVS PFC DCM boost rectifier with a full-bridge primary configuration and a transformer, according to an embodiment of the present invention.

FIG. 26 shows another three-phase three-level single-stage isolated ZVS PFC DCM boost rectifier with switches $S_1$-$S_8$ and an isolated output, according to an embodiment of the present invention. The primary side of the isolated circuit in FIG. 26 is similar to the circuit of FIG. 2, except for split flying capacitors $C_{R1}$ and $C_{R2}$, auxiliary switches $S_5$-$S_8$, additional clamping diodes $D_{C3}$ and $D_{C4}$, and transformer TR that consists of a primary winding and a center-tap secondary winding. On the secondary side of transformer TR, rectifiers $D_{O1}$-$D_{O2}$ and output filter components $L_O$ and $C_O$ are coupled between the secondary windings of transformer TR and output voltage $V_O$. Blocking capacitor $C_B$ is connected in series with transformer TR to eliminate any dc current flowing through the primary windings of transformer TR.

Figure 27:
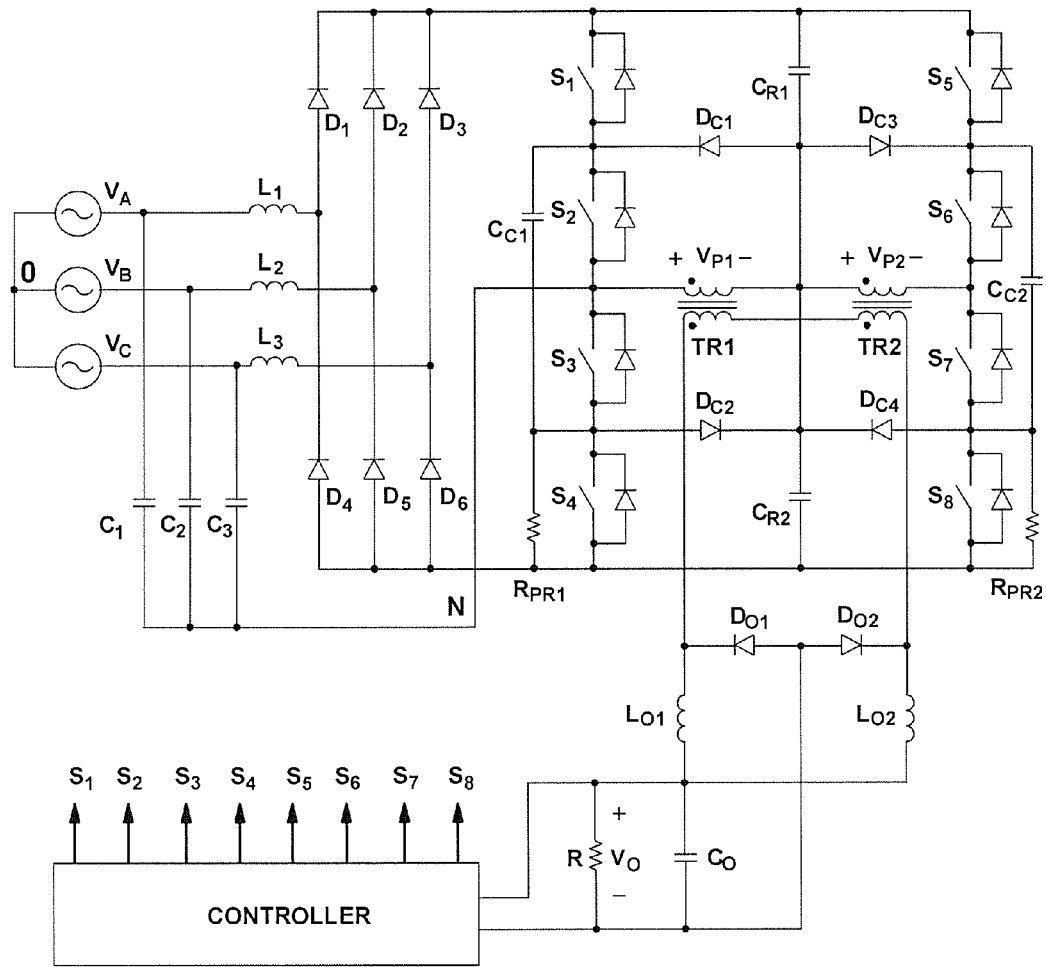
FIG. 27 shows a three-phase three-level single-stage isolated ZVS PFC DCM boost rectifier with coupled two half-bridge primary configuration and series connected two transformers, according to an embodiment of the present invention.

FIG. 27 shows a three-phase three-level single-stage isolated ZVS PFC DCM boost rectifier with coupled half-bridge primary configurations and series connected transformers $TR_1$ and $TR_2$, according to one embodiment of the present invention.

Although the isolated circuits shown in FIGS. 14-27 show the output circuit with a center-tap secondary winding of the transformer and two output diodes, the output circuit may also be implemented using any known output rectifier topology, such as the current doubler rectifier, the full-bridge rectifier, the half-bridge with voltage doubler capacitors, within the scope of the present invention. In addition, a synchronous rectifier can be employed instead of low-voltage diode rectifiers.

The invention claimed is:

1. A low input-current-harmonic three-phase boost rectifier, comprising:
    an input stage for receiving a three-phase input voltage relative to a neutral node, the input stage comprising three terminals, each terminal being coupled to one of the three phases of the three-phase input voltage;
    an output stage adapted to couple to at least one load, the output stage comprising a plurality of serially connected output capacitors that are coupled between the neutral node and said load;
    one or more input capacitors each coupled between a terminal of said input stage and said neutral node;
    one or more switching converter stages, each switching converter comprising:
        two or more pluralities of serially-connected switches, each plurality of switches being coupled to said neutral node, at least one of the switches of said plurality of serially-connected switches operating at a variable frequency with a substantially 50% duty cycle and at least one of the switches of said plurality of serially-connected switches operating with a variable duty cycle that is less than or substantially equal to 50%;
        one or more clamping capacitors each coupled to a common node of the switches of said pluralities of serially-connected switches;
        one or more clamping diodes each clamping one of the common nodes to one of the voltages across the serially connected output capacitors;
        one or more boost inductors each coupled to one of the terminals of the input stage to receive a corresponding one of the phases of the three-phase input voltage;
        one or more input rectifier diodes each coupled between one of the boost inductors and a terminal of one of said pluralities of serially-connected switches; and
        one or more flying capacitors coupled across said pluralities of serially-connected switches; and
        one or more controllers adapted to vary at least one of (a) the switching frequency and (b) the duty cycle, based on at least one of: conditions at the load, the input voltage, and the output voltage; and
    one or more decoupling stages, each decoupling stage provided to be connected to a corresponding one of the converter stages and each decoupling stage comprising a primary inductive element and a secondary inductive element, such that the corresponding switching converter stage is connected across a terminal of the primary inductive element and a terminal of the secondary inductive element, so as to decouple the output stage from the corresponding switching converter stage.

2. The low input-current-harmonic boost rectifier of claim 1, wherein the maximum voltage across each switch is substantially one half of the output voltage.

3. The low input-current-harmonic boost rectifier of claim 1, wherein one or more switches of the plurality of switches are turned on at a substantially zero voltage switching condition.

4. The low input-current-harmonic boost rectifier of claim 1, wherein the variable switching frequency varies between (a) a minimum frequency determined by a full load and a minimum input voltage, and (b) a maximum frequency determined by a light load and a maximum input voltage.

5. The low input-current-harmonic boost rectifier of claim 1, wherein the variable duty cycle varies between (a) a maximum duty cycle determined by a minimum input voltage, and (b) a minimum duty cycle determined by a maximum input voltage.

6. The low input-current-harmonic boost rectifier of claim 1, wherein the variable duty cycle varies between (a) a maximum duty cycle determined by a full load and a minimum input voltage, and (b) a minimum duty cycle determined by a light load and a maximum input voltage.

7. The low input-current-harmonic boost rectifier of claim 1, wherein the variable duty cycle is varied based on a pulse-width modulation control scheme.

8. The low input-current-harmonic boost rectifier of claim 1, wherein the variable duty cycle is varied based on a phase shift control scheme.

9. The low input-current-harmonic boost rectifier of claim 1, wherein the controllers are adapted to operate in a burst mode over a range between a light load and no load.

10. The low input-current-harmonic boost rectifier of claim 1, wherein the inductive elements are magnetically coupled.

11. The low input-current-harmonic boost rectifier of claim 1, wherein each one of the output capacitors is adapted to couple across at least one load.

12. The low input-current-harmonic boost rectifier of claim 1, wherein the voltage across each one of the output capacitors are substantially equal.

13. The low input-current-harmonic boost rectifier of claim 1, further comprising a blocking capacitor coupled between the neutral node and one of the output capacitors of the output stage.

14. The low input-current-harmonic boost rectifier of claim 1, wherein the output capacitors of the output stages are coupled to an input neutral wire of a three-phase four-wire input system.

15. The low input-current-harmonic boost rectifier of claim 1, wherein one or more pre-charge resistors are coupled between one of the clamping capacitors and one of the flying capacitors.

16. The low input-current-harmonic boost rectifier of claim 1, wherein one or more inrush current control circuits are coupled between the input voltage and the capacitors.

17. The low input-current-harmonic boost rectifier of claim 1, wherein the input stage further comprises input electromagnetic interference (EMI) filters.

18. The low input-current-harmonic boost rectifier of claim 1, wherein the input bridge diodes are synchronous rectifiers.

19. The low input-current-harmonic boost rectifier of claim 1, wherein each switch comprises a metal-oxide-semiconductor field-effect transistor (MOSFET) or an insulated gate bipolar transistor (IGBT) with an antiparallel diode.

20. The low input-current-harmonic boost rectifier of claim 1, wherein each switch is connected to at least one snubber capacitor in parallel.

21. The low input-current-harmonic boost rectifier of claim 1, wherein the switching converter stages are each coupled to a corresponding one of the one or more decoupling stages, and wherein the controllers are further adapted to operate the switches in an interleaved or a parallel manner.

22. The low input-current-harmonic boost rectifier of claim 1, wherein the switching converter stages are each being coupled to a corresponding one of the one or more decoupling stages through one or more blocking capacitors, and wherein the controllers are further adapted to operate the switches in an interleaved or a parallel manner.

23. A low input-current-harmonic three-phase boost rectifier, comprising:
    an input stage for receiving a three-phase input voltage relative to a neutral node, the input stage comprising three terminals, each terminal being coupled to one of the three phases of the three-phase input voltage;
    an output stage adapted to couple to at least one load;

one or more input capacitors each coupled between a terminal of the input stage and said neutral node;

one or more switching converter stages, each switching converter comprising:

two or more pluralities of serially-connected switches that are coupled to said neutral node, at least one of said serially-connected switches operating at a variable frequency with a substantially 50% duty cycle and at least one of said serially-connected switches operating with a variable duty cycle that is less than or substantially equal to 50%;

one or more clamping capacitors each being coupled across common nodes between switches of said pluralities of serially-connected switches;

one or more boost inductors that are each coupled to one of the terminals of the input stage;

one or more input rectifier diodes each coupled between one of the boost inductors and a terminal of one of said serially-connected switches; and one or more flying capacitors coupled across said switches;

an energy storage stage that couples at least one of the switching converters, the energy storage stage comprising:

a plurality of serially connected energy storage capacitors connected between the neutral node and the coupled switching converters, and one or more clamping diodes each clamping one of the common nodes to a voltage across a corresponding one of the storage capacitors; and one or more decoupling stages, each decoupling stage being connected to a corresponding one of the switching converter stages and each decoupling stage comprising a primary inductive element and a second inductive element, such that the corresponding switching converter stage is connected across a terminal of the primary inductive element and a terminal of the secondary inductive element, so as to inductively decouple the energy storage stage from the corresponding switching converter stage;

one or more controllers adapted to vary the switching frequency and the duty cycle, based on at least one of: conditions of the load, the input voltage, and the output voltage; and one or more isolation stages, each comprising one or more transformers adapted to isolate the output stage from at least one of the switching converter stages.

24. The low input-current-harmonic boost rectifier of claim 23, wherein said at least one transformer comprises at least one primary winding and one secondary winding, said secondary winding being coupled to a plurality of rectifiers.

25. The low input-current-harmonic boost rectifier of claim 23, wherein said flying capacitors are coupled across said switches and are also coupled to at least one transformer to form at least one half-bridge converter.

26. The low input-current-harmonic boost rectifier of claim 24, wherein said secondary winding and said rectifiers are adapted to form a full-wave rectifier.

27. The low input-current-harmonic boost rectifier of claim 24, wherein said secondary winding further comprising a center-tapped winding, and wherein said center-tapped winding and said rectifiers are adapted to form a full-wave rectifier.

28. The low input-current-harmonic boost rectifier of claim 24, wherein said secondary winding and said rectifiers are adapted to form a current-doubler rectifier.

29. The low input-current-harmonic boost rectifier of claim 24, wherein said secondary-side rectifiers comprise synchronous rectifiers.

30. The low input-current-harmonic boost rectifier of claim 24, further comprising one or more output filters on the secondary side of the at least one transformer.

31. The low input-current-harmonic boost rectifier of claim 23, wherein one or more of the serially-connected switches are turned on under a substantially zero voltage switching condition.

32. The low input-current-harmonic boost rectifier of claim 23, further comprising one or more hold-up time switches coupled across the inductive elements and one or more diodes coupled between the input rectifier diodes and the plurality of serially-connected switches.

33. The low input-current-harmonic boost rectifier of claim 32, wherein the one or more hold-up time switches operates just after the input voltage drop out to extend the hold-up time.

34. The low input-current-harmonic boost rectifier of claim 23, further comprising one or more hold-up time switches coupled across the inductive elements, one or more charging diodes coupled between the boost inductors and the hold-up time switches, and one or more diodes coupled between the inductive elements and the plurality of serially-connected switches.

35. The low input-current-harmonic boost rectifier of claim 23, wherein the variable switching frequency varies between (a) a minimum frequency determined by a full load and a minimum input voltage, and (b) a maximum frequency determined by a light load and a maximum input voltage.

36. The low input-current-harmonic boost rectifier of claim 23, wherein the variable duty cycle varies between (a) a maximum duty cycle determined by a minimum input voltage, and (b) a minimum duty cycle determined by a maximum input voltage.

37. The low input-current-harmonic boost rectifier of claim 23, wherein the variable duty cycle varies between (a) a maximum duty cycle determined by a full load and a minimum input voltage, and (b) a minimum duty cycle determined by a light load and a maximum input voltage.

38. The low input-current-harmonic boost rectifier of claim 23, wherein the variable duty cycle is varied based on a pulse-width modulation control scheme.

39. The low input-current-harmonic boost rectifier of claim 23, wherein the variable duty cycle is varied based on a phase shift control scheme.

40. The low input-current-harmonic boost rectifier of claim 23, wherein the controllers are adapted to operate in a burst mode over a range between a light load and no load.

41. The low input-current-harmonic boost rectifier of claim 23, wherein the inductive elements are magnetically coupled.

42. The low input-current-harmonic boost rectifier of claim 23, wherein one or more inrush current control circuits are coupled between the input voltage and the capacitors.

43. The low input-current-harmonic boost rectifier of claim 23, wherein the input stage further comprises input electromagnetic interference (EMI) filters.

44. The low input-current-harmonic boost rectifier of claim 23, wherein the input bridge diodes are synchronous rectifiers.

45. The low input-current-harmonic boost rectifier of claim 23, wherein each switch comprises a MOSFET or an IGBT with an antiparallel diode.

46. The low input-current-harmonic boost rectifier of claim 23 wherein a plurality of auxiliary series switches are coupled to said switches through said at least one transformer, wherein the controller is further adapted to operate said auxiliary switches according to at least one of phase-shift or pulse width modulation.

47. The low input-current-harmonic boost rectifier of claim 46 wherein said auxiliary switches are coupled to said switches through said at least one transformer to form at least one full-bridge converter.

48. The low input-current-harmonic boost rectifier of claim 46, wherein the transformer comprises a primary winding coupled between the junction of the auxiliary switches and the neutral node.

49. The low input-current-harmonic boost rectifier of claim 46, wherein the transformer comprises a primary winding coupled through one or more blocking capacitors to the neutral node.

* * * * *